United States Patent
Lee et al.

(10) Patent No.: US 12,489,577 B2
(45) Date of Patent: Dec. 2, 2025

(54) METHOD FOR TRANSMITTING AND RECEIVING DATA IN SHORT-RANGE WIRELESS COMMUNICATION SYSTEM, AND APPARATUS THEREFOR

(71) Applicant: LG ELECTRONICS INC., Seoul (KR)

(72) Inventors: Hyeonjae Lee, Seoul (KR); Minsoo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 315 days.

(21) Appl. No.: 18/275,201

(22) PCT Filed: Feb. 7, 2022

(86) PCT No.: PCT/KR2022/001866
§ 371 (c)(1),
(2) Date: Jul. 31, 2023

(87) PCT Pub. No.: WO2022/169335
PCT Pub. Date: Aug. 11, 2022

(65) Prior Publication Data
US 2024/0313912 A1 Sep. 19, 2024

(30) Foreign Application Priority Data
Feb. 5, 2021 (KR) .................. 10-2021-0016928

(51) Int. Cl.
*H04W 76/15* (2018.01)
*H04L 5/00* (2006.01)
*H04W 76/14* (2018.01)
(52) U.S. Cl.
CPC ........... *H04L 5/0048* (2013.01); *H04W 76/14* (2018.02); *H04W 76/15* (2018.02)

(58) Field of Classification Search
CPC ...... H04L 5/0048; H04W 76/15; H04W 76/14
See application file for complete search history.

(56) References Cited

U.S. PATENT DOCUMENTS

2011/0305164 A1\* 12/2011 Zhang .................. H04B 7/0617
370/252
2012/0188876 A1 7/2012 Chow et al.
(Continued)

FOREIGN PATENT DOCUMENTS

KR 10-2010-0068770 A 6/2010
KR 10-2014-0066751 A 6/2014
(Continued)

*Primary Examiner* — Chandrahas B Patel
*Assistant Examiner* — Andrew Shaji Kurian
(74) *Attorney, Agent, or Firm* — BRYAN CAVE LEIGHTON PAISNER LLP

(57) ABSTRACT

A method of transmitting and receiving data in a short-range wireless communication system, and a device therefor are provided. More specifically, a method of receiving, by a master device, data in a short-range wireless communication system comprises transmitting, to a slave device, a read request message requesting a reading of at least one data transmission period supported by the slave device; receiving, from the slave device, a read response message including information on the at least one data transmission period supported by the slave device; receiving, from the slave device, a message indicating a selection of a specific content among at least one content related to a service provided by the master device; transmitting, to the slave device, a message for configuring a specific data transmission period among the at least one data transmission period supported by the slave device to the slave device based on (i) a type of the selected specific content and (ii) the information on the at least one data transmission period supported by the slave device; and receiving, from the slave device, the data based on the configured specific data transmission period. The (Continued)

method comprises, based on the type of the selected specific content being changed, transmitting, to the slave device, a message for reconfiguring the data transmission period of the slave device based on the changed type of the content.

15 Claims, 21 Drawing Sheets

(56) References Cited

U.S. PATENT DOCUMENTS

| | | | | |
|---|---|---|---|---|
| 2016/0023102 | A1* | 1/2016 | Tagawa | A63F 13/214 |
| | | | | 463/31 |
| 2018/0126277 | A1* | 5/2018 | Yan | A63F 13/25 |
| 2021/0146239 | A1* | 5/2021 | Hiatt | A63F 13/335 |
| 2021/0362063 | A1* | 11/2021 | Hiatt | A63F 13/32 |

FOREIGN PATENT DOCUMENTS

| | | | |
|---|---|---|---|
| KR | 10-2014-0098555 A | 8/2014 | |
| KR | 10-2017-0097785 A | 8/2017 | |
| KR | 10-2020-0081413 A | 7/2020 | |
| WO | WO-2019191996 A1 * | 10/2019 | ............. G05B 19/04 |

\* cited by examiner

[FIG. 1]
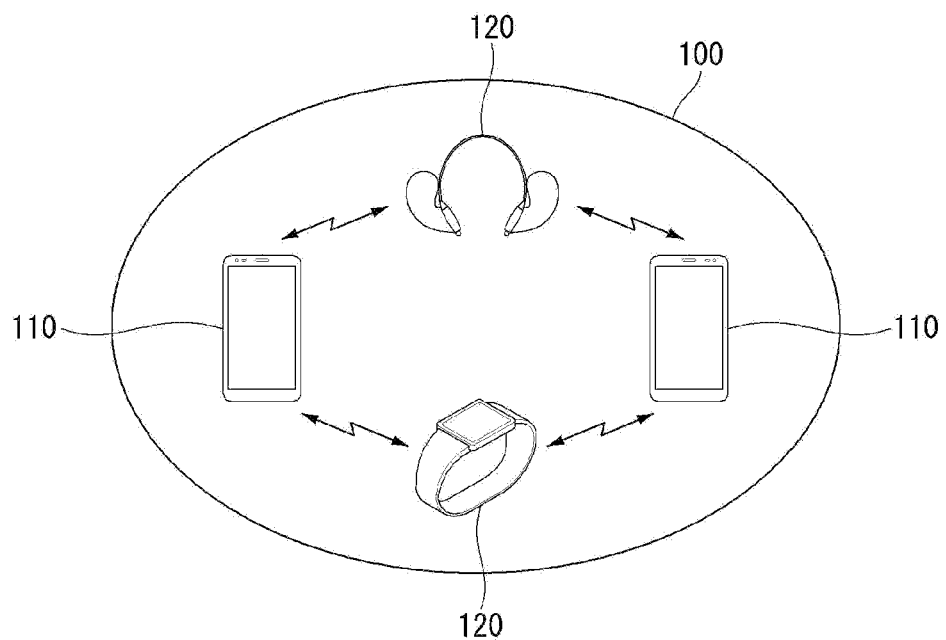

[FIG. 2]
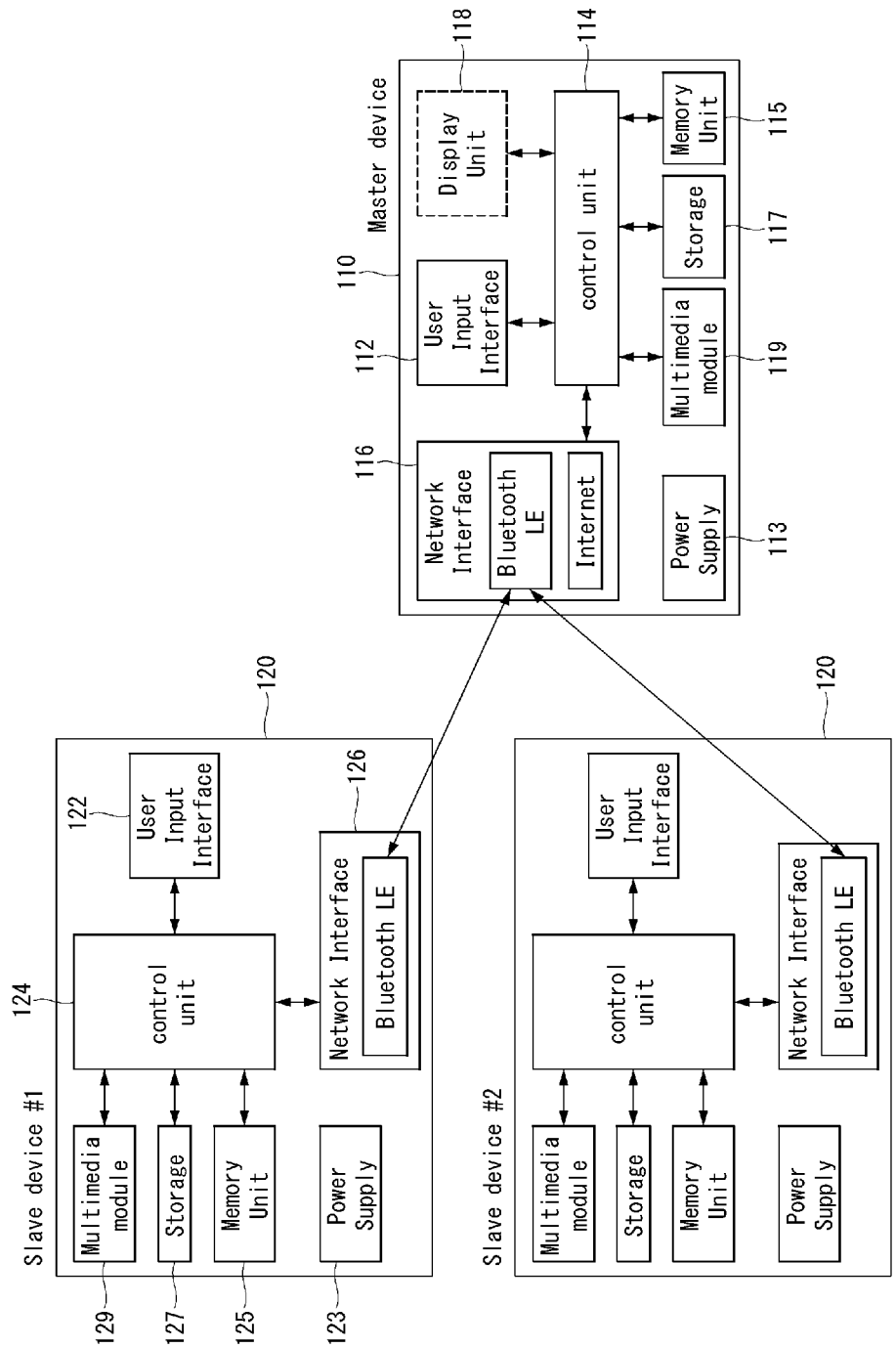

[FIG. 3]
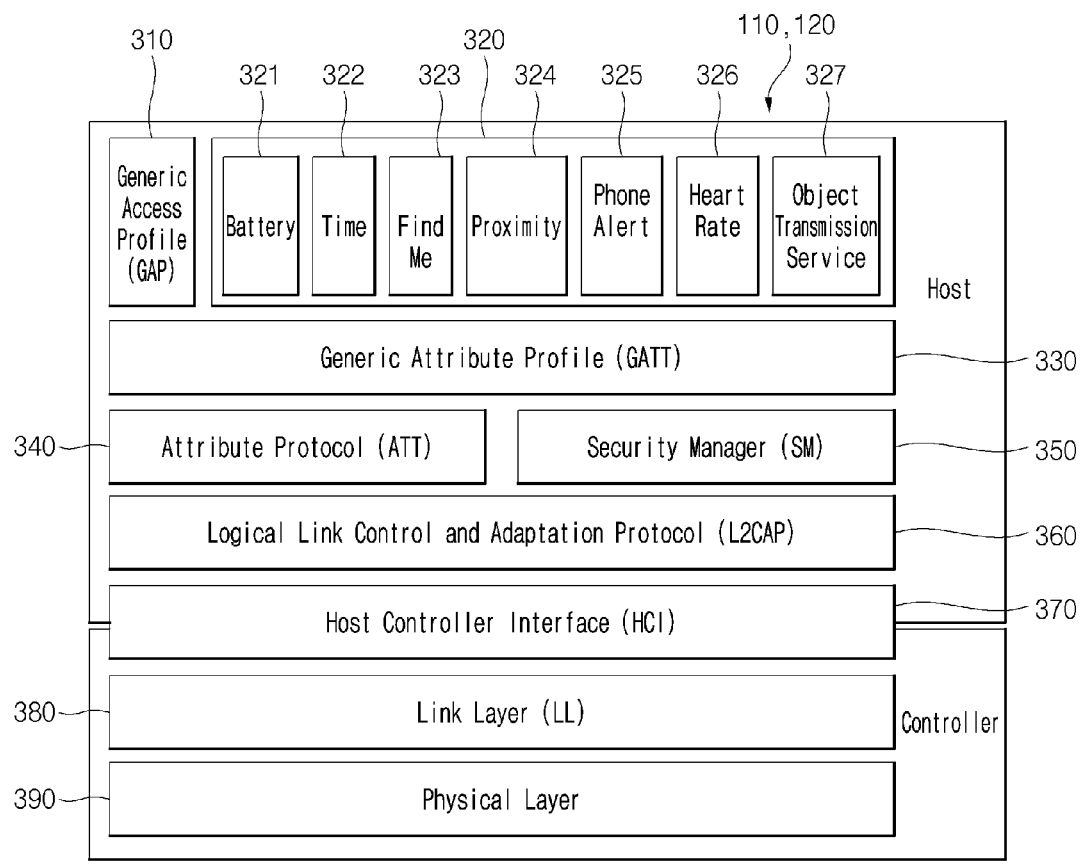

[FIG. 4]
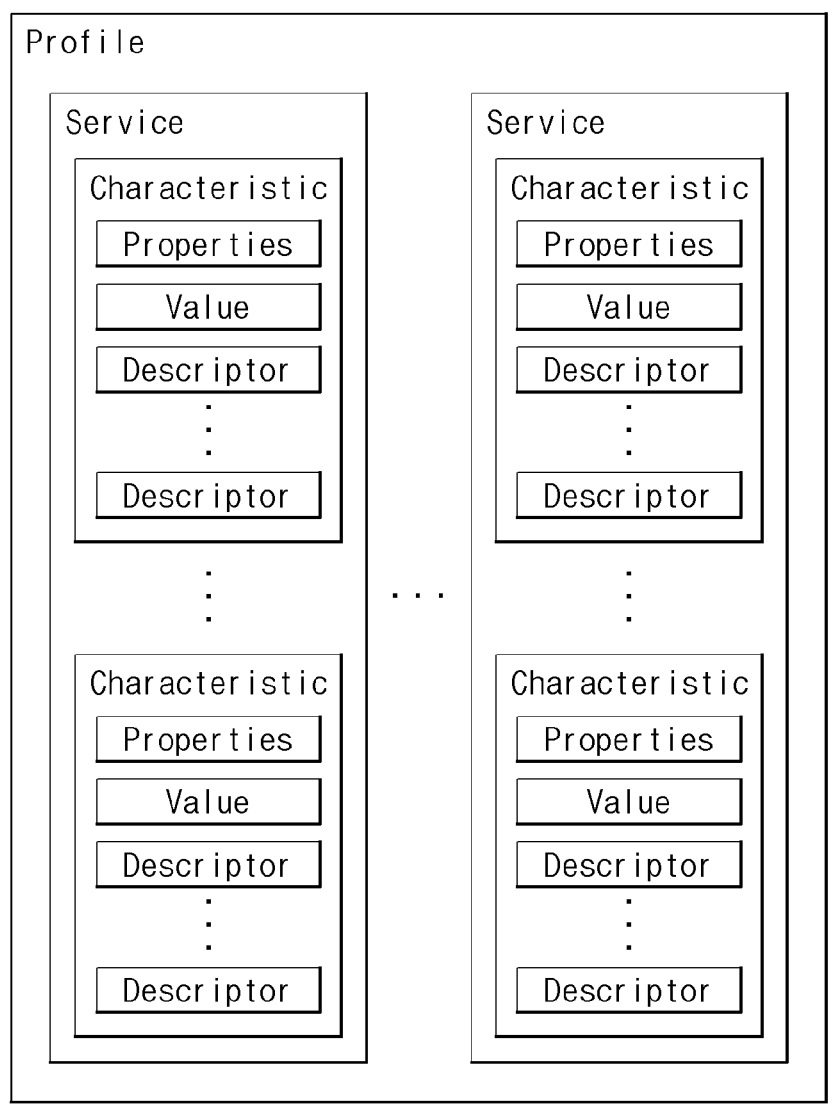

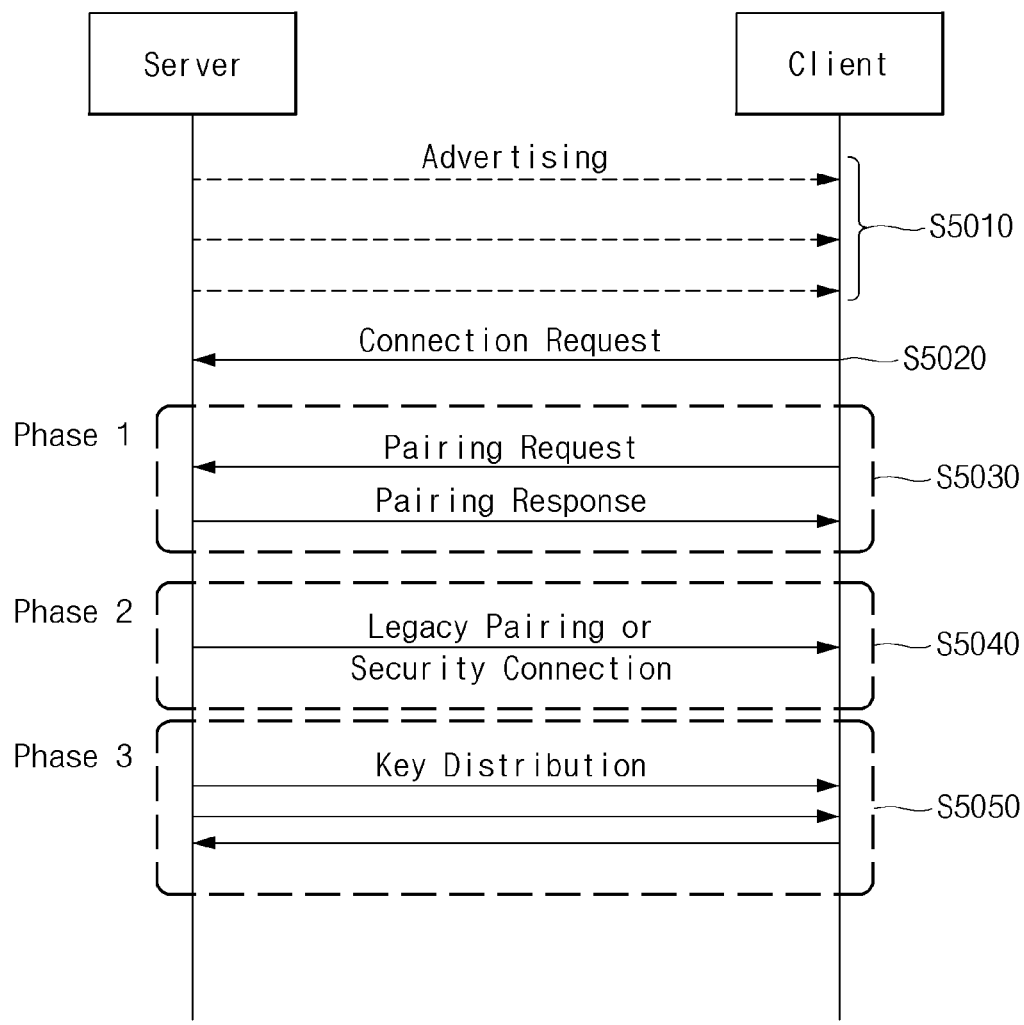

[FIG. 6]
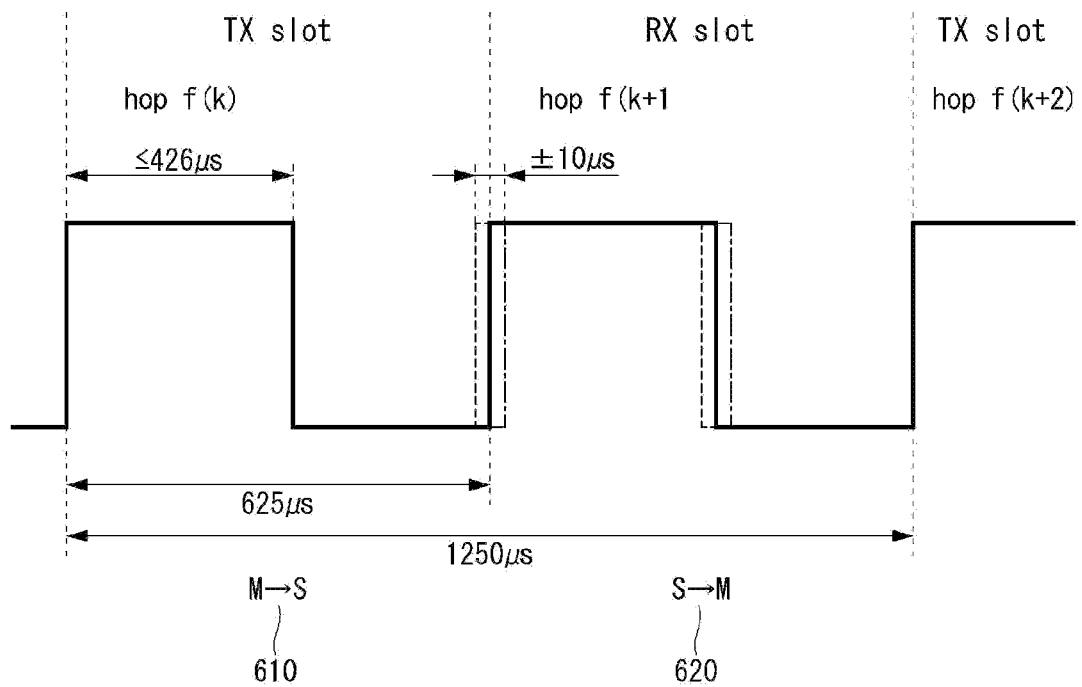
[FIG. 7]
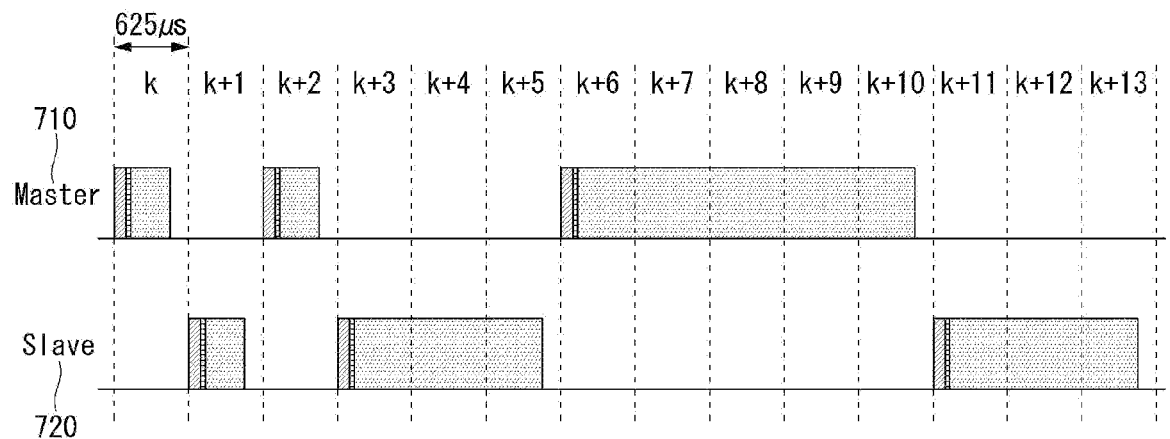

[FIG. 8]
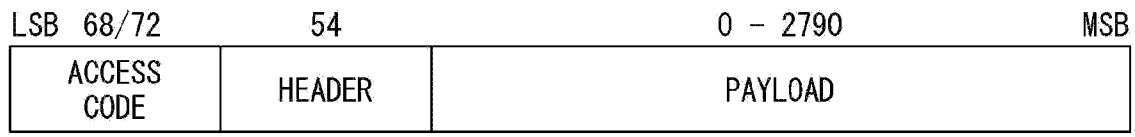
3bit : address
[FIG. 9]
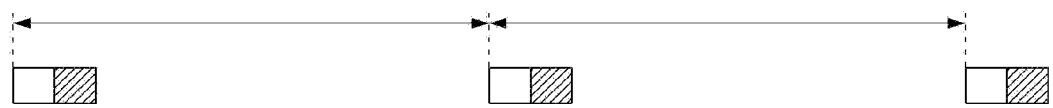
[FIG. 10]
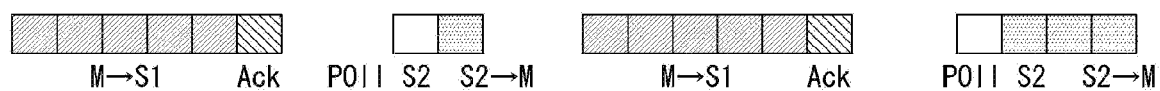
[FIG. 11]
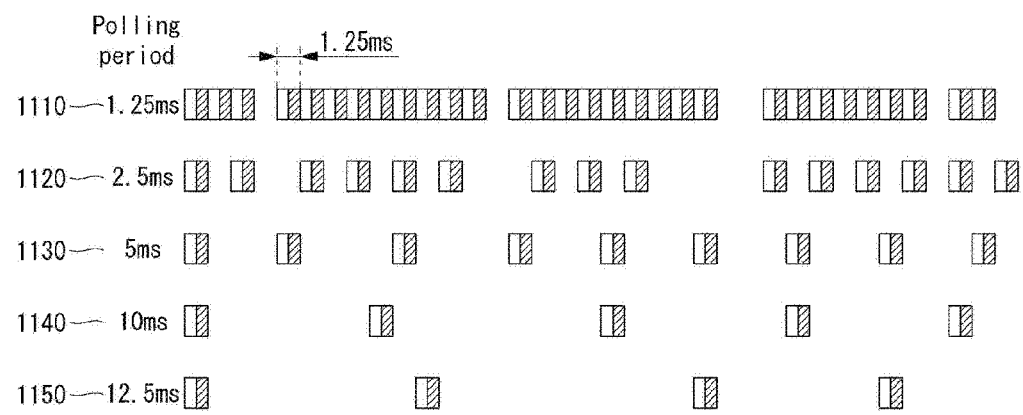

[FIG. 12]
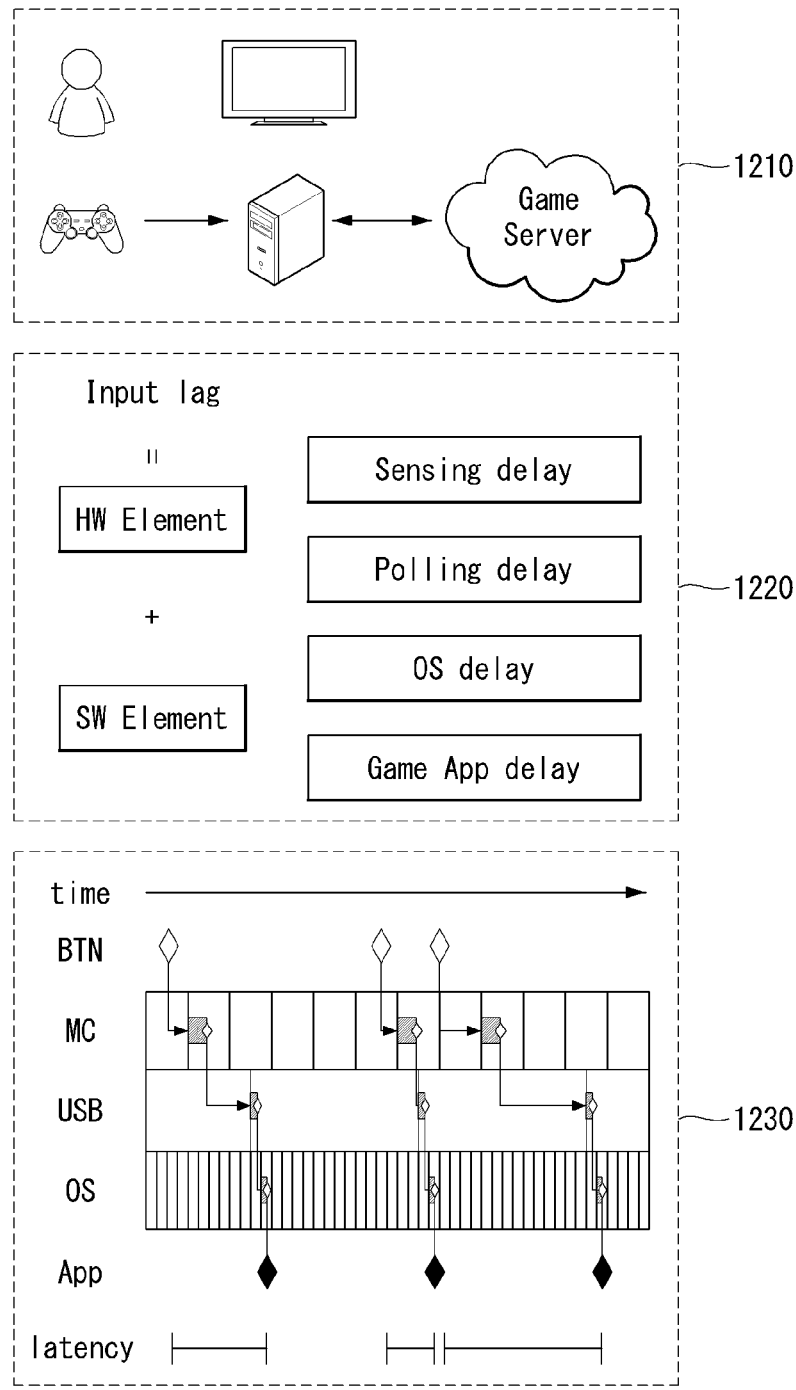

[FIG. 13]
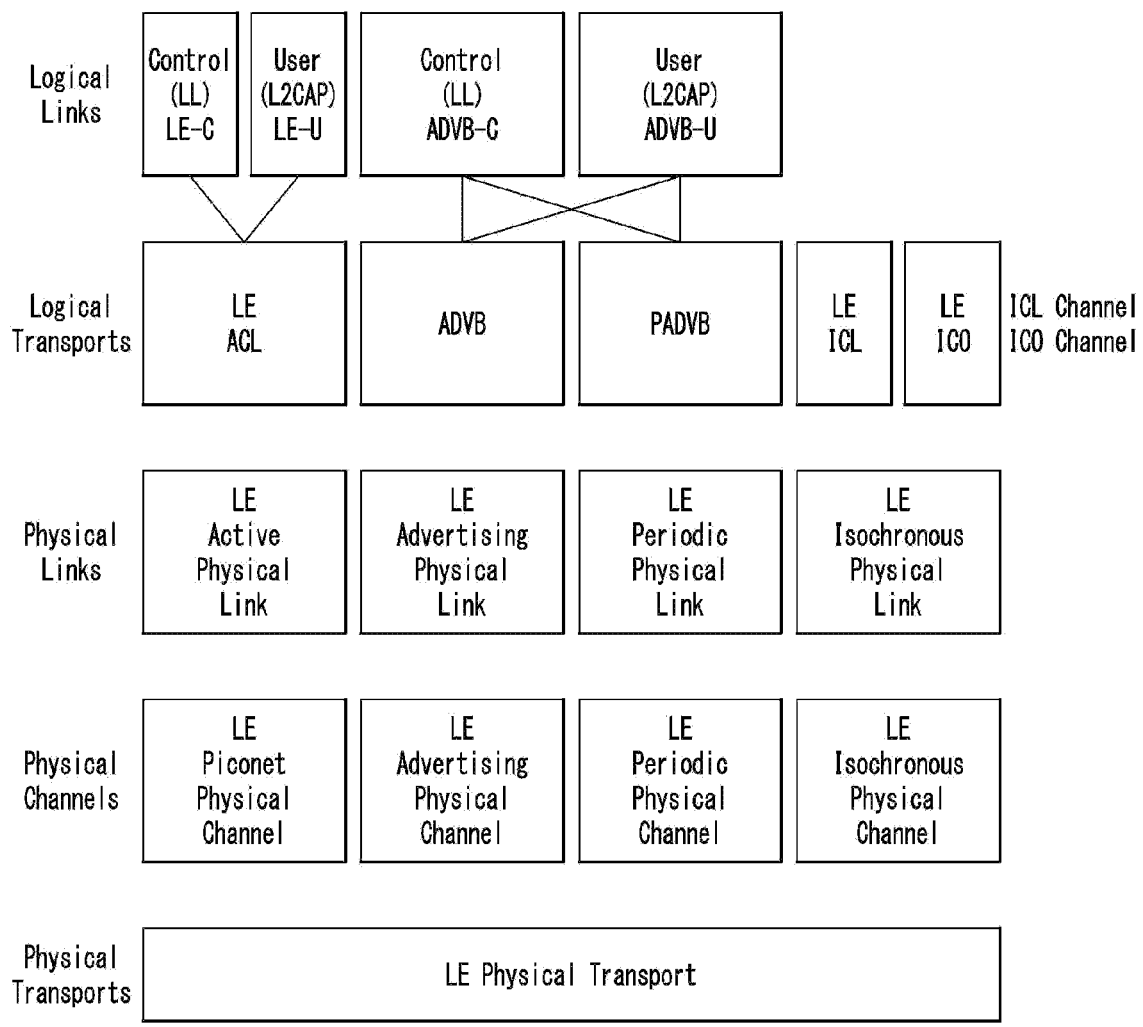

[FIG. 14]
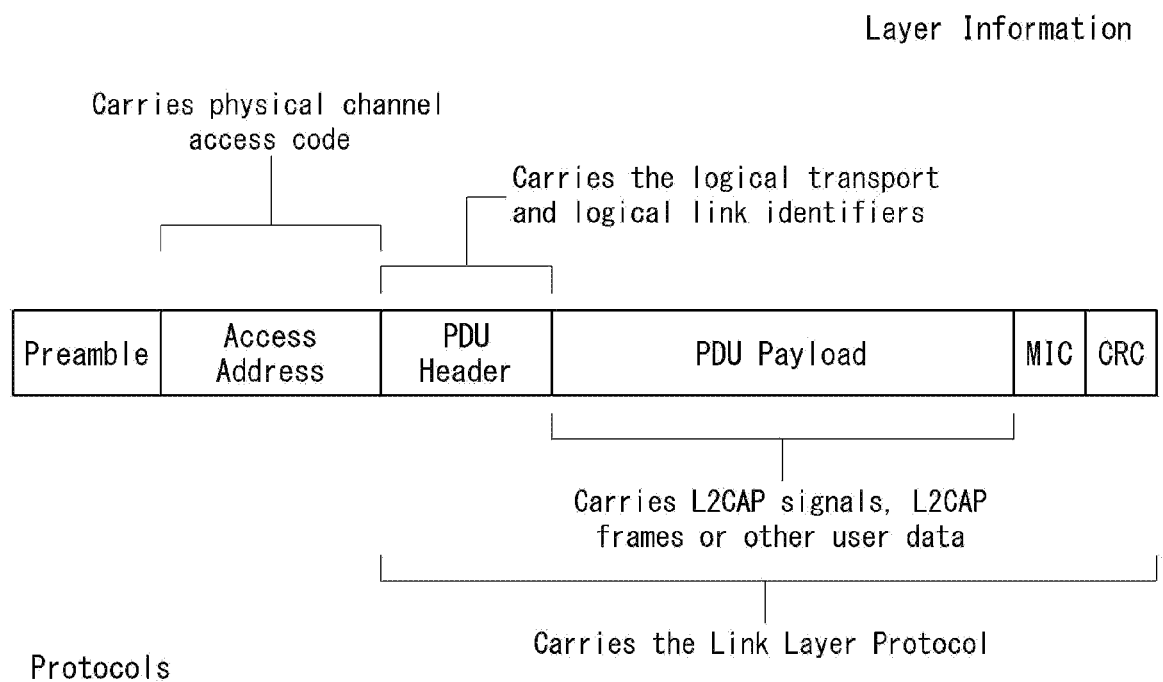

[FIG. 15]
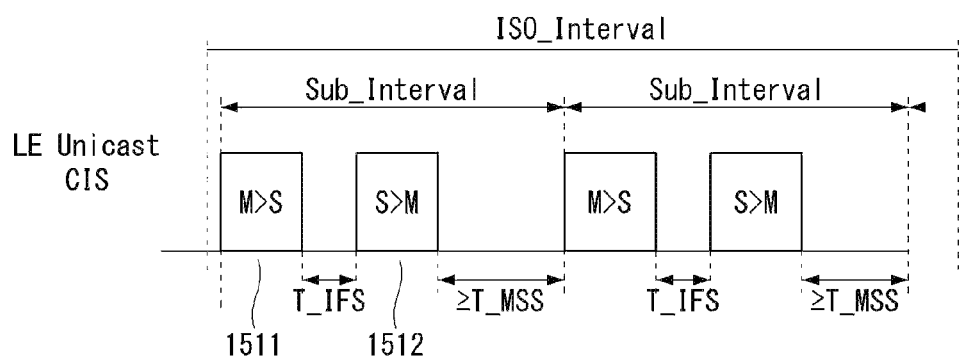
(a)
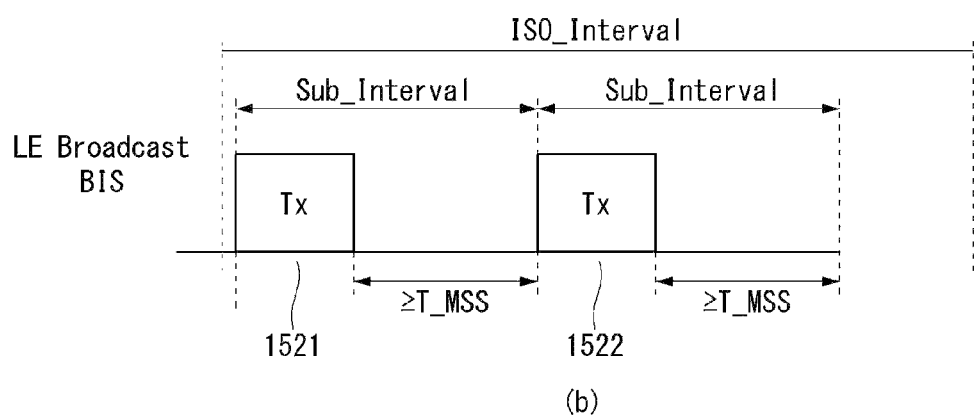
(b)

[FIG. 16]
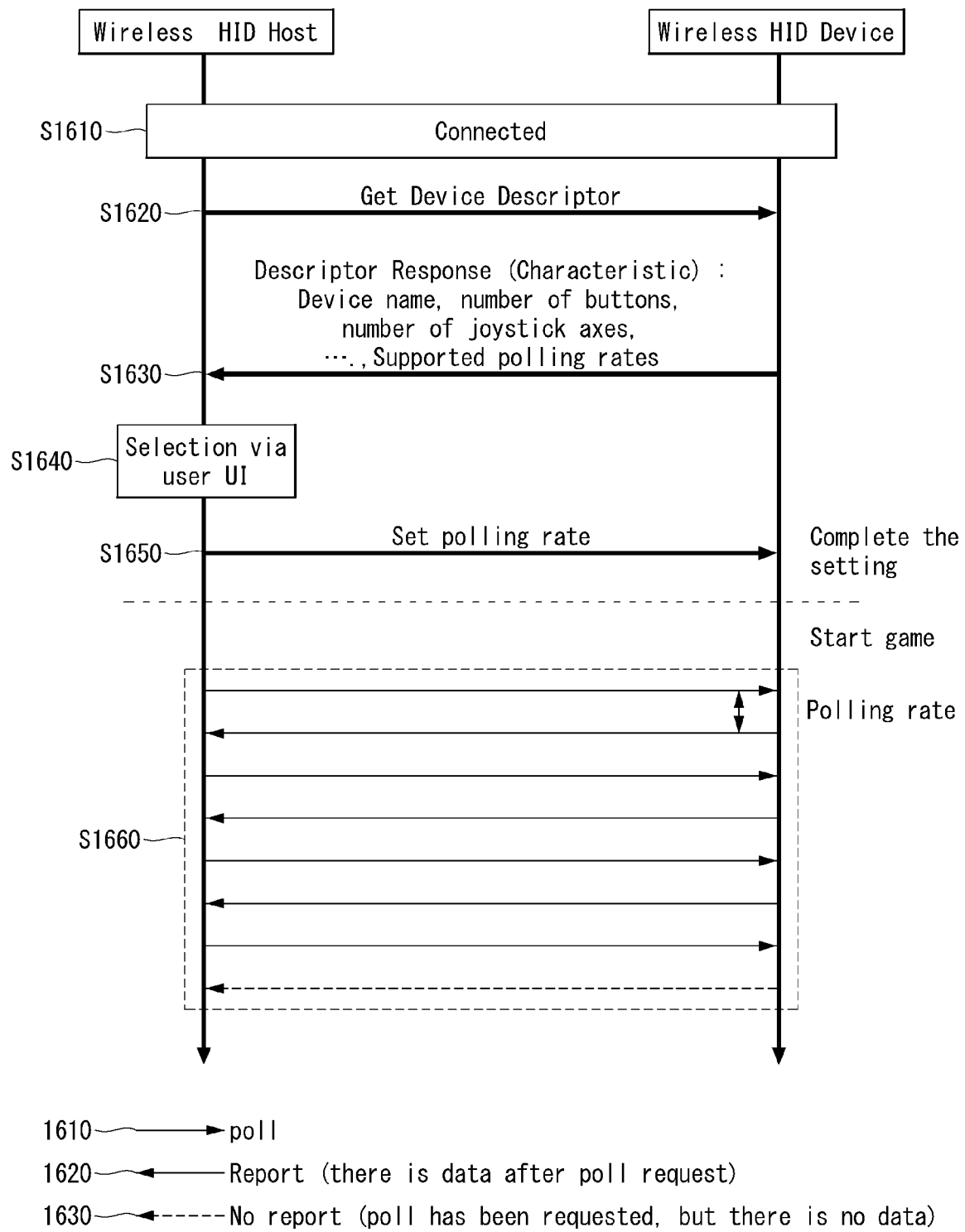

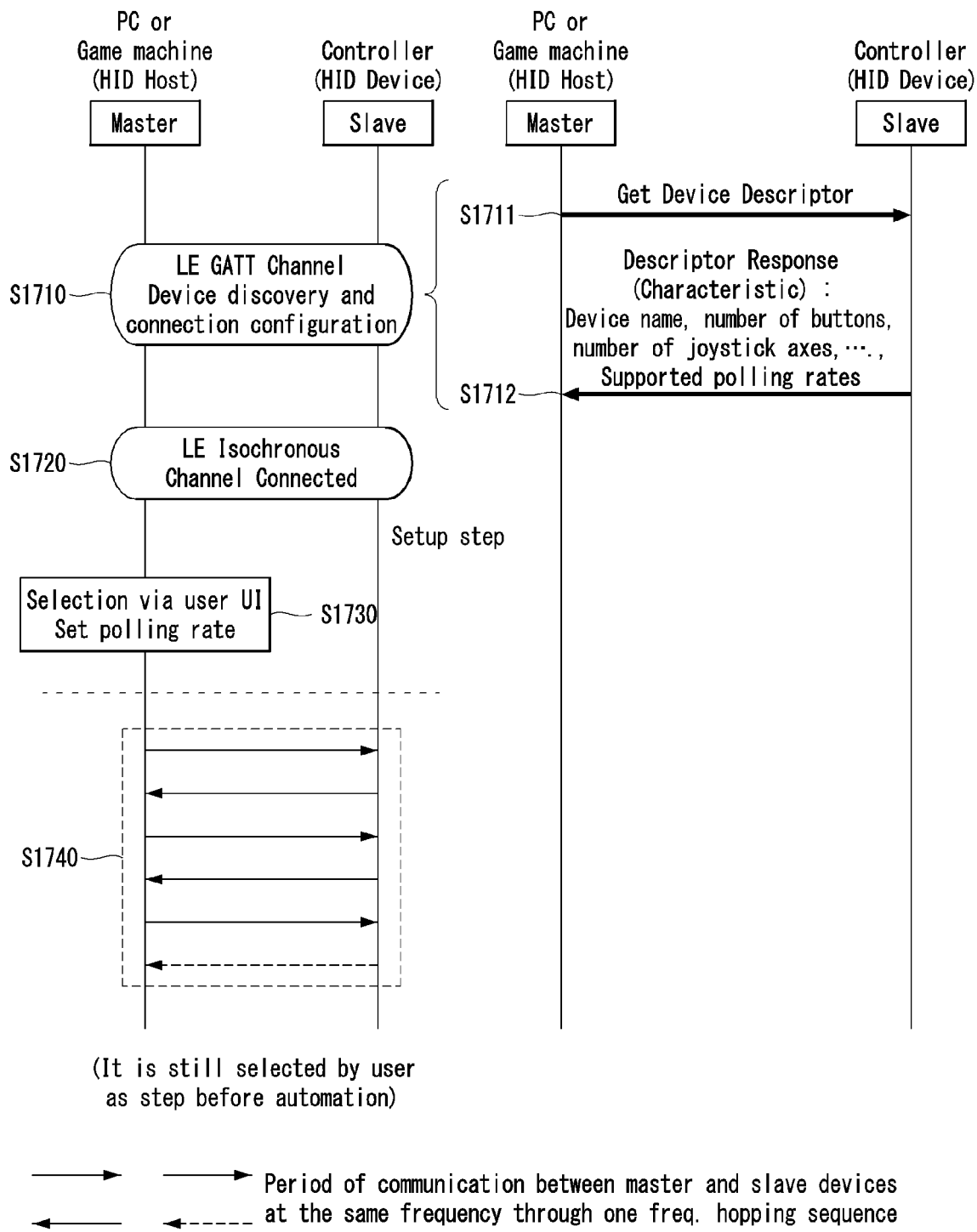
[FIG. 17]

[FIG. 18]
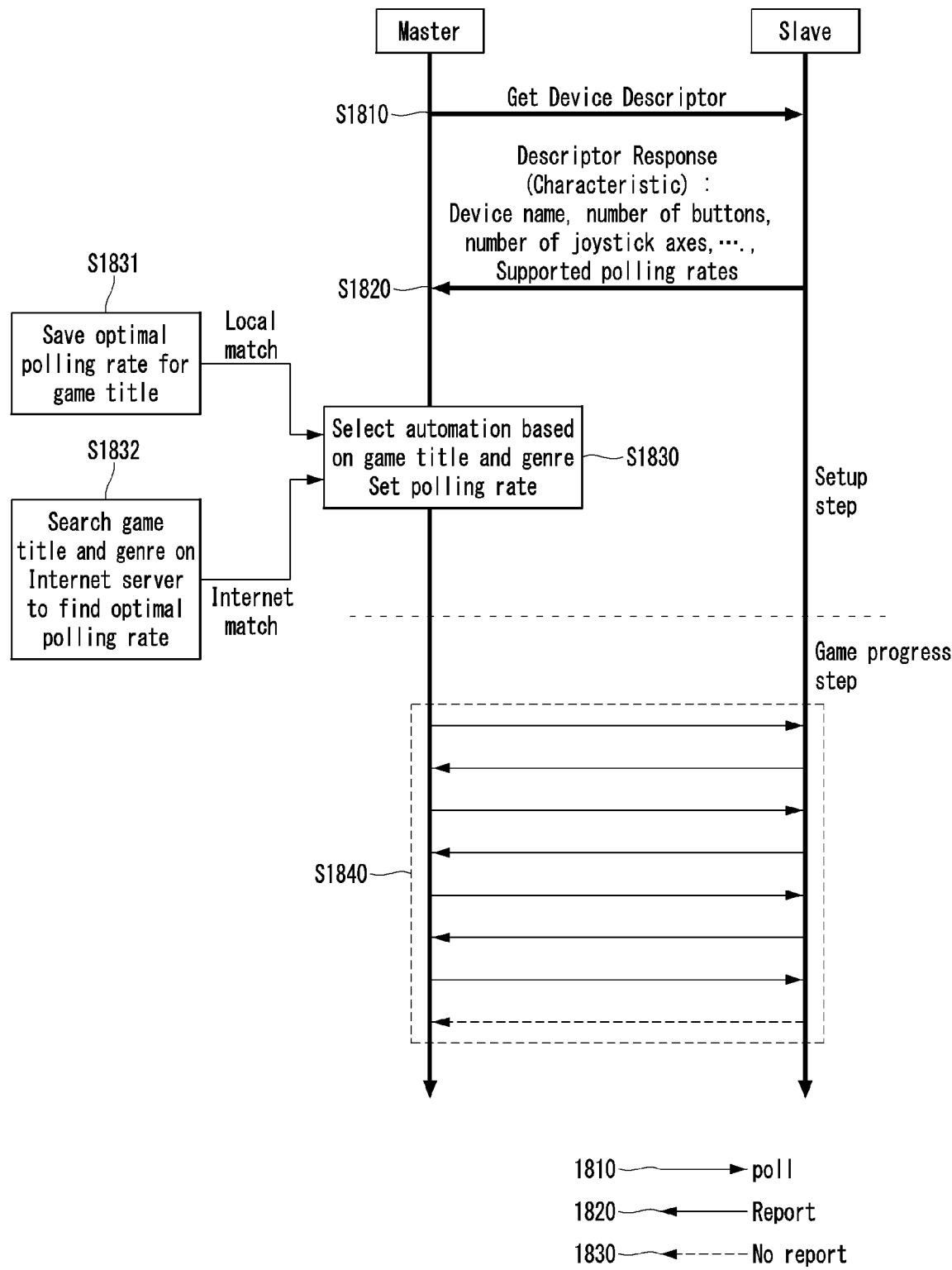

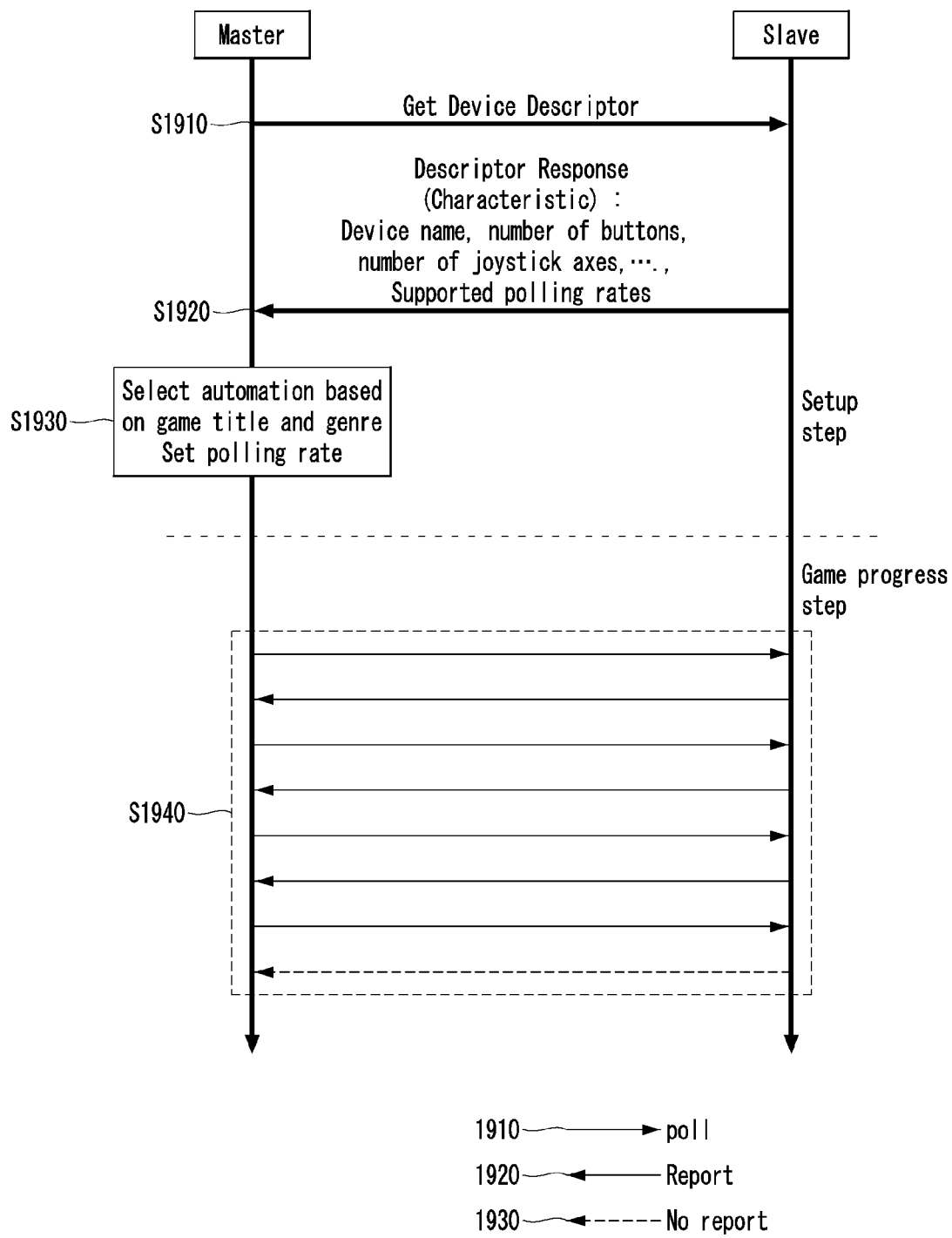

[FIG. 20]
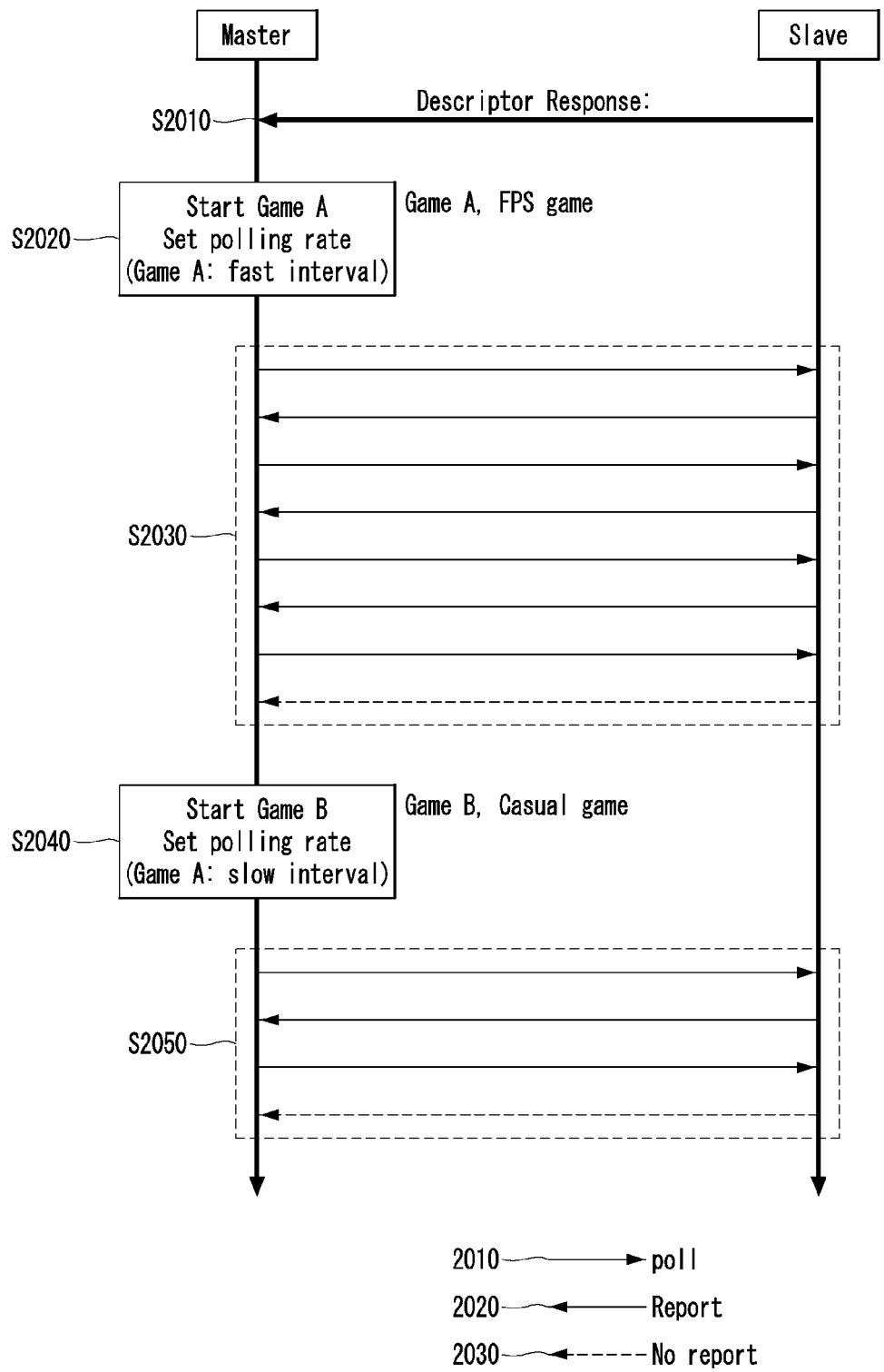

[FIG. 21]

| | Game Preference Polling rate | HID Device Support Polling rate | HID Host Support Polling rate | Device host Common value (optional value) | Polling rate to set |
|---|---|---|---|---|---|
| 2110 | 5ms | 2ms, 5ms, 10ms, 15ms | 1ms ~ 20ms (1ms interval) | 2ms, 5ms, 10ms, 15ms | 5ms |
| 2120 | 1ms | 2ms, 5ms, 10ms, 15ms | 2ms ~ 10ms (2ms interval) | 2ms, 5ms, 10ms | 2ms |
| 2130 | 1ms | 1ms, 2ms, 5ms, 10ms | 1ms ~ 20ms (1ms interval) | 1ms, 2ms, 5ms, 10ms | 1ms |
| 2140 | 30ms | 2ms, 10ms, 15ms | 5ms ~ 25ms (1ms interval) | 2ms, 10ms, 15ms | 15ms |
| 2150 | 5ms | 2ms ~ 10ms (1ms interval) | 1ms ~ 20ms (1ms interval) | 2ms ~ 10ms (1ms interval) 5ms | 5ms |

[FIG. 22]
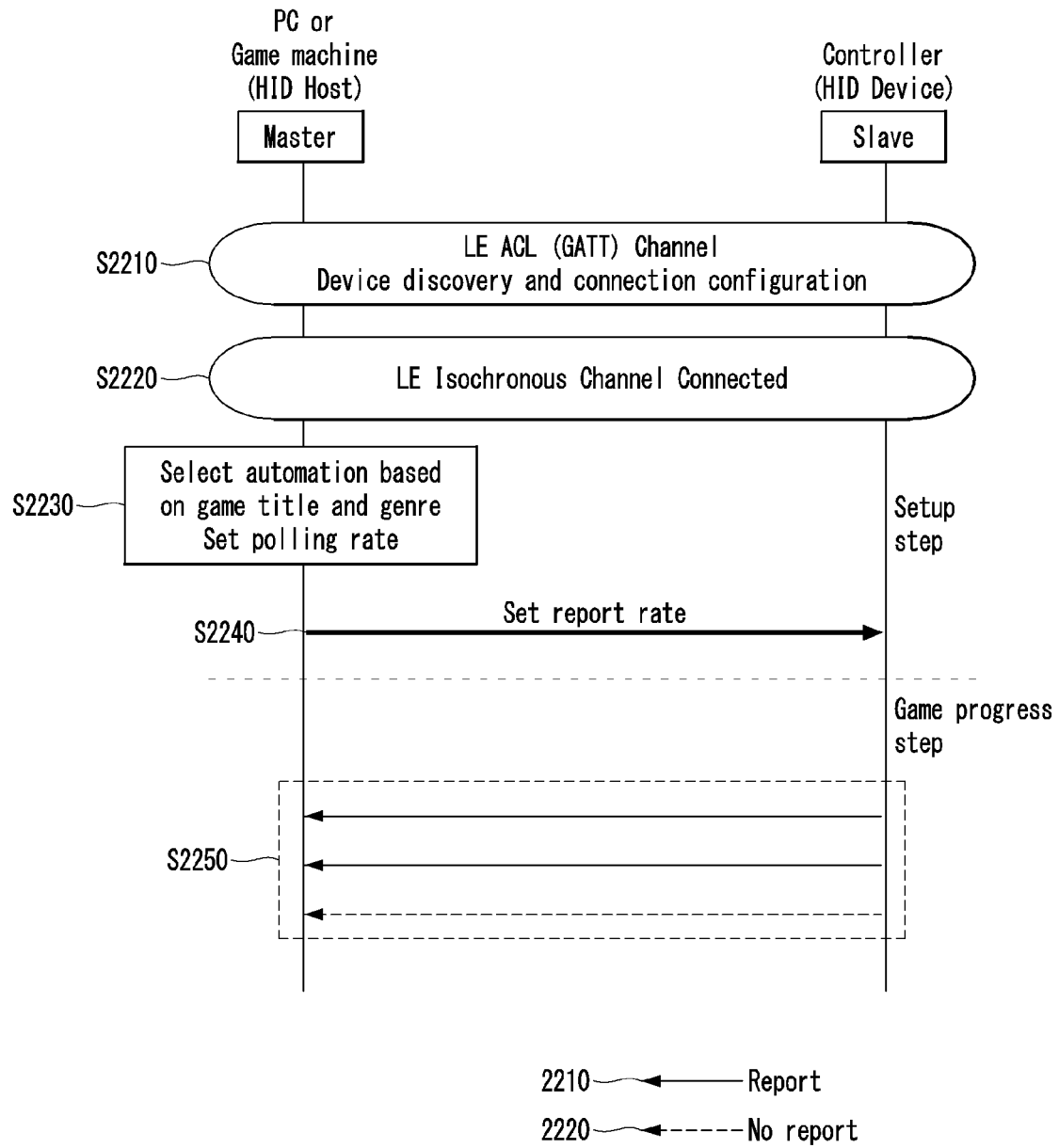

[FIG. 23]
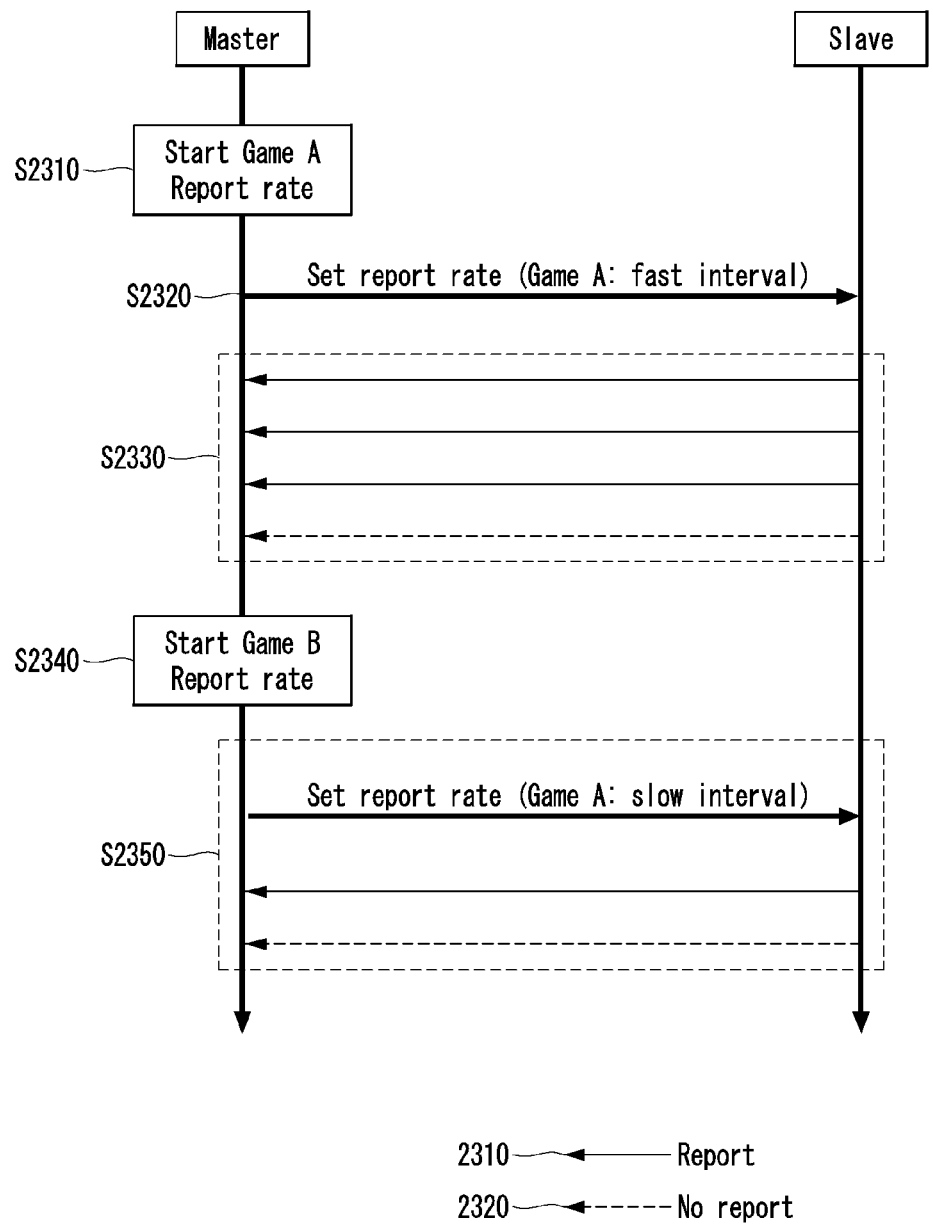

[FIG. 24]
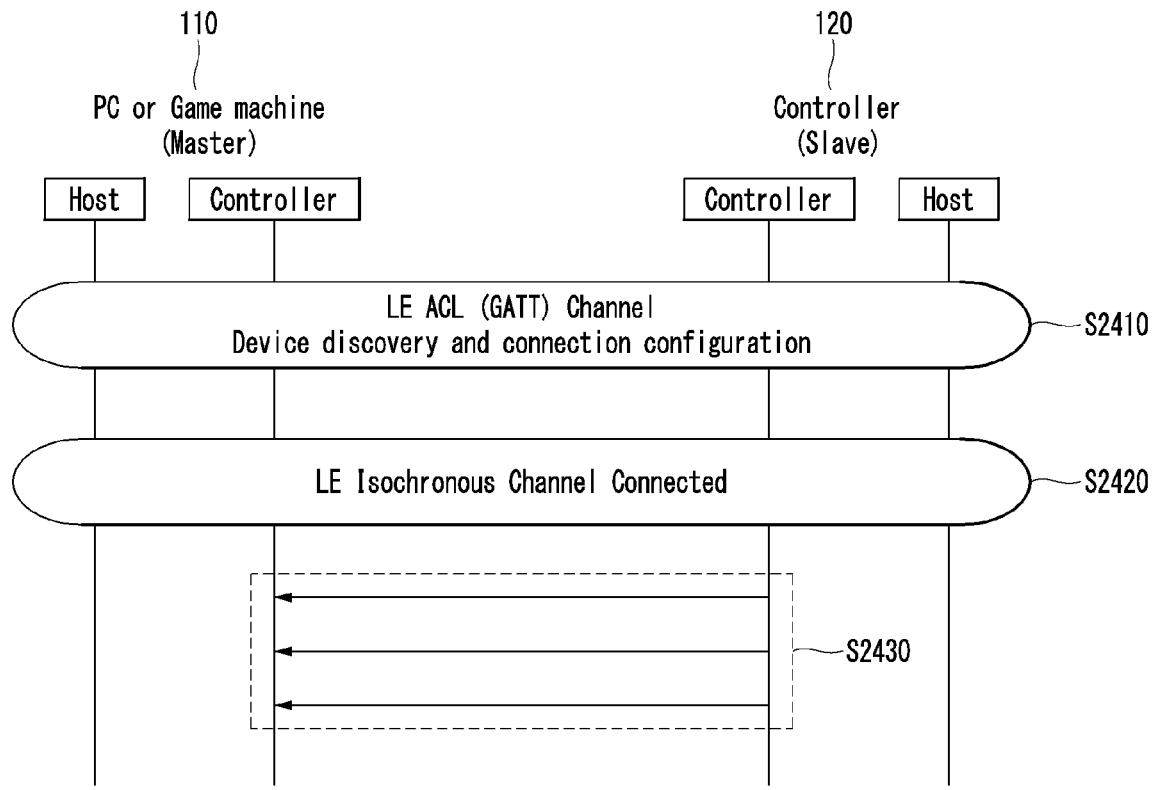
[FIG. 25]
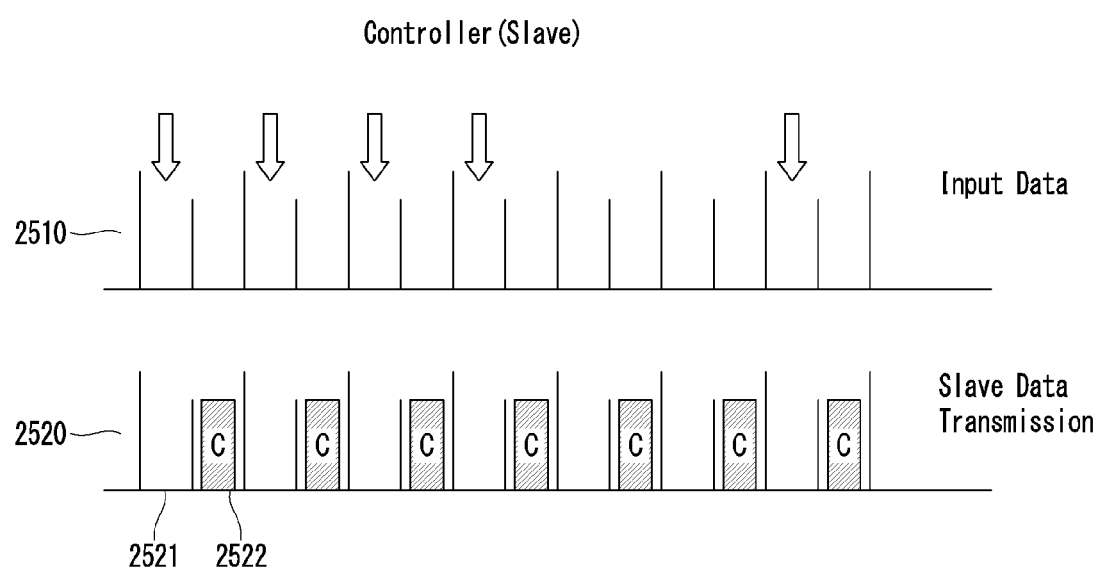

[FIG. 26]
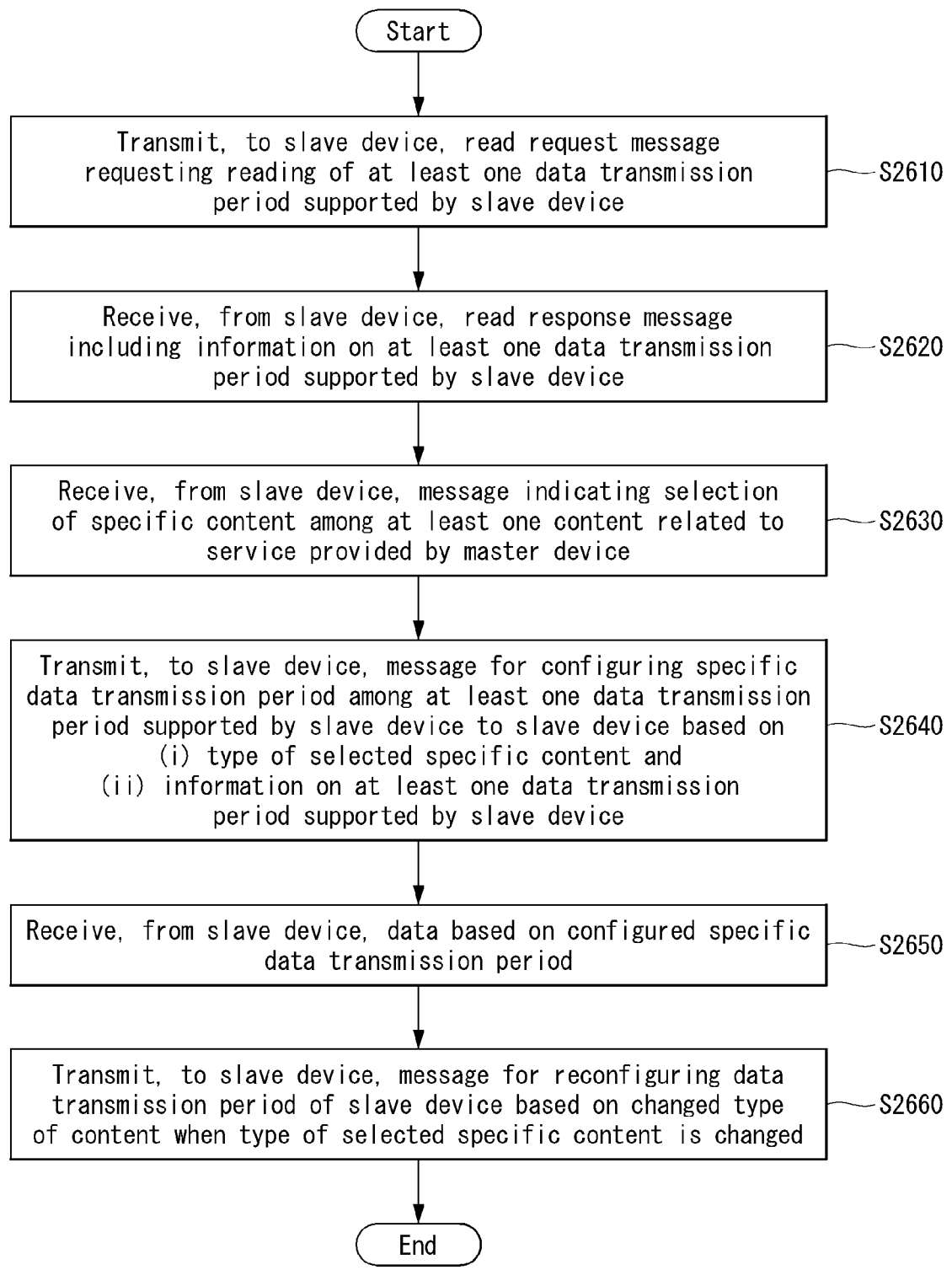

METHOD FOR TRANSMITTING AND RECEIVING DATA IN SHORT-RANGE WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2022/001866, filed on Feb. 7, 2022, which claims the benefit of Korean Patent Application No. 10-2021-0016928, filed on Feb. 5, 2021, which are hereby incorporated by reference herein in their entirety.

TECHNICAL FIELD

The present disclosure relates to a method for transmitting and receiving data in a short-range wireless communication system and a device therefor, and more particularly to a method and device for transmitting data using Bluetooth technology which is a short-range wireless communication technology.

BACKGROUND ART

Bluetooth is a near field communication standard allowing various devices to be wirelessly connected in a near field to exchange data. When two devices intend to perform wireless communication using Bluetooth communication, a user performs a procedure for discovering a Bluetooth device with which he or she wants to communicate and requesting a connection. In the present disclosure, a device may refer to an apparatus or an appliance.

In this instance, the user may search for a Bluetooth device based on a Bluetooth communication method to be used using the Bluetooth device, and then perform a connection.

Examples of the Bluetooth communication method include a Bluetooth basic rate/enhanced data rate (BR/EDR) method and a Bluetooth low energy (LE) method which is a low power method. The Bluetooth BR/EDR method may be referred to as classic Bluetooth. The classic Bluetooth method includes a Bluetooth technology that has been continued from Bluetooth 1.0 using a basic rate to Bluetooth 2.1 and a Bluetooth technology using an enhanced data rate supported since Bluetooth 2.0.

The Bluetooth low energy (hereinafter 'Bluetooth LE') technology can stably provide information of hundreds of kilobytes by consuming low energy. The Bluetooth LE technology exchanges information between devices by utilizing an attribute protocol. This Bluetooth LE method can reduce energy consumption by reducing overhead of a header and simplifying an operation.

Some Bluetooth devices have no display or user interface. Complexity of connection/management/control/disconnection between various types of Bluetooth devices and between Bluetooth devices applying similar technologies has increased.

Further, Bluetooth can achieve a relatively high speed at relatively low energy and low cost, but a transmission distance is limited to a maximum of 100 m. Therefore, Bluetooth is suitable for use in a limited space.

DISCLOSURE

Technical Problem

An object of the present disclosure is to provide a method of transmitting data in a short-range wireless communication system and a device therefor.

Another object of the present disclosure is to provide a method of configuring a data transmission period optimized based on a type of content of a game service and a device therefor.

Another object of the present disclosure is to provide a method of constructing a preferred data transmission period table per content configuring a data transmission period optimized based on a type of content of a game service and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure provides a method of transmitting data in a short-range wireless communication system and a device therefor.

More specifically, in one aspect of the present disclosure, there is provided a method of receiving, by a master device, data in a short-range wireless communication system, the method comprising transmitting, to a slave device, a read request message requesting a reading of at least one data transmission period supported by the slave device: receiving, from the slave device, a read response message including information on the at least one data transmission period supported by the slave device: receiving, from the slave device, a message indicating a selection of a specific content among at least one content related to a service provided by the master device: transmitting, to the slave device, a message for configuring a specific data transmission period among the at least one data transmission period supported by the slave device to the slave device based on (i) a type of the selected specific content and (ii) the information on the at least one data transmission period supported by the slave device; and receiving, from the slave device, the data based on the configured specific data transmission period, wherein the method comprises, based on the type of the selected specific content being changed, transmitting, to the slave device, a message for reconfiguring the data transmission period of the slave device based on the changed type of the content.

The method further comprises receiving, from the slave device, the data based on a data transmission period reconfigured based on the message for reconfiguring the data transmission period of the slave device.

The method further comprises receiving, from the slave device, a message indicating a selection of a different content from the specific content among the at least one content related to the service provided by the master device. The content provided by the master device is changed based on the message indicating the selection of the different content from the specific content.

Data transmission period mapping information for a recommendation data transmission period for each of the at least one content related to the service provided by the master device is pre-configured to the master device.

A data transmission period configuration for the slave device related to one content is performed based on (i) the data transmission period mapping information and (ii) the information on the data transmission period supported by the slave device.

The data transmission period configuration for the slave device related to the one content is performed based on a value closest to a recommendation data transmission period value for the one content represented by the data transmission period mapping information among at least one common value commonly included in (i) a data transmission period supported by the master device and (ii) the at least one data transmission period supported by the slave device.

The data transmission period mapping information further includes mode based recommendation data transmission period information for each of different operation modes provided by the one content.

The method further comprises receiving, from the slave device, a message indicating an operation mode change in the selected specific content; and transmitting, to the slave device, a message for configuring the data transmission period of the slave device based on (i) the changed operation mode, (ii) the information on the at least one data transmission period supported by the slave device, and (iii) the mode based recommendation data transmission period information.

The data transmission period mapping information is a mapping relationship between a title of the content and a specific recommendation data transmission period value.

The method further comprises, based on the type of the selected specific content being a type that is not included in the data transmission period mapping information, transmitting, to a server providing the service to the master device, a message requesting recommendation data transmission period information for the selected specific content.

The data is generated based on a user input for the slave device.

Receiving the data comprises transmitting, to the slave device, a poll message requesting a transmission of the data; and receiving the data in response to the poll message. The poll message is transmitted in the same period as the configured data transmission period of the slave device, and the data is transmitted based on a data transmission period of the slave device configured based on the user input being present.

A channel on which the data is transmitted is an asynchronous channel.

Receiving the data is performed based on a data transmission period of the slave device configured without a poll message. The data is transmitted based on the user input being present, and a channel on which the data is transmitted is an isochronous channel.

In another aspect of the present disclosure, there is provided a master device receiving data in a short-range wireless communication system, the master device comprising a transmitter configured to transmit a radio signal, a receiver configured to receive the radio signal, at least one processor, and at least one computer memory operably connectable to the at least one processor, wherein the at least one computer memory is configured to store instructions that allow the at least one processor to perform operations based on being executed by the at least one processor, wherein the operations comprise transmitting, to a slave device, a read request message requesting a reading of at least one data transmission period supported by the slave device; receiving, from the slave device, a read response message including information on the at least one data transmission period supported by the slave device; receiving, from the slave device, a message indicating a selection of a specific content among at least one content related to a service provided by the master device: transmitting, to the slave device, a message for configuring a specific data transmission period among the at least one data transmission period supported by the slave device to the slave device based on (i) a type of the selected specific content and (ii) the information on the at least one data transmission period supported by the slave device; and receiving, from the slave device, the data based on the configured specific data transmission period, wherein the operations comprise, based on the type of the selected specific content being changed, transmitting, to the slave device, a message for reconfiguring the data transmission period of the slave device based on the changed type of the content.

Advantageous Effects

The present disclosure has an effect of transmitting data in a short-range wireless communication system.

The present disclosure also has an effect of configuring a data transmission period optimized based on a type of content of a game service.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

FIG. 1 schematically illustrates an example of a wireless communication system using a Bluetooth low energy technology described in the present disclosure.

FIG. 2 illustrates an example of an internal block diagram of a device capable of implementing methods described in the present disclosure.

FIG. 3 illustrates an example of a Bluetooth communication architecture to which methods described in the present disclosure are applicable.

FIG. 4 illustrates an example of a structure of a generic attribute profile (GATT) of Bluetooth low energy.

FIG. 5 is a flowchart illustrating an example of a connecting procedure method in Bluetooth low energy technology to which the present disclosure is applicable.

FIG. 6 illustrates an example of a data transmission/reception method in a BR/EDR scheme for helping understanding of a method described in the present disclosure.

FIG. 7 illustrates another example of a data transmission/reception method in a BR/EDR scheme for helping understanding of a method described in the present disclosure.

FIG. 8 illustrates an example of a data packet format for data transmission/reception in a BR/EDR scheme for helping understanding of a method described in the present disclosure.

FIG. 9 illustrates another example of a data transmission/reception method in a BR/EDR scheme for helping understanding of a method described in the present disclosure.

FIG. 10 illustrates another example of a data transmission/reception method in a BR/EDR scheme for helping understanding of a method described in the present disclosure.

FIG. 11 illustrates another example of a data transmission/reception method in a BR/EDR scheme for helping understanding of a method described in the present disclosure.

FIG. 12 illustrates an example of using a game content using Bluetooth low energy for helping understanding of a method described in the present disclosure.

FIG. 13 illustrates an example of a protocol stack to which a method described in the present disclosure is applicable.

FIG. 14 illustrates an example of a data packet format capable of being used in a protocol stack to which a method described in the present disclosure is applicable.

FIG. 15 illustrates an example of a data transmission/reception method to which a method described in the present disclosure is applicable.

FIG. 16 is a flowchart illustrating an example of performing a method described in the present disclosure.

FIG. 17 is a flowchart illustrating another example of performing a method described in the present disclosure.

FIG. 18 is a flowchart illustrating another example of performing a method described in the present disclosure.

FIGS. 19 and 20 illustrate another example of performing a method described in the present disclosure.

FIG. 21 illustrates an example of a method of constructing data transmission period mapping information described in the present disclosure.

FIGS. 22 and 23 are flowcharts illustrating another example of performing a method described in the present disclosure.

FIG. 24 illustrates another example of performing a method described in the present disclosure.

FIG. 25 illustrates an example of isochronous data transmission of a slave device.

FIG. 26 is a flowchart illustrating an example where a method of transmitting data in a short-range wireless communication system described in the present disclosure is performed by a master device.

MODE FOR INVENTION

The accompanying drawings, which are included to provide a further understanding of the present disclosure and constitute a part of the detailed description, illustrate embodiments of the present disclosure and serve to explain technical features of the present disclosure together with the description. Reference will now be made in detail to embodiments of the disclosure, examples of which are illustrated in the accompanying drawings. Wherever possible, the same reference numbers will be used throughout the drawings to refer to the same or like parts. Detailed descriptions of known arts will be omitted if such may mislead the embodiments of the disclosure. It is noted that the accompanying drawings are only for easily understanding the spirit of the present disclosure and it should not be interpreted that the spirit of the present disclosure is limited by the accompanying drawings.

Hereinafter, a method and a device related to the present disclosure will be described in more detail with reference to the drawings. In addition, a general term used in the present disclosure should be interpreted as defined in a dictionary or contextually, and should not be interpreted as an excessively reduced meaning. Further, singular expression used in the present disclosure includes plural expression unless the context clearly dictates otherwise. In the present disclosure, a term such as "comprising" or "including" should not be interpreted as necessarily including all various components or various steps disclosed in the present disclosure, and it should be interpreted that some component or some steps among them may not be included or additional components or steps may be further included. Suffixes "unit", "module", and "section" for components used in the following description are given or mixed in consideration of easy preparation of the disclosure only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 shows an example of an internal block diagram of a device capable of implementing methods proposed in the present disclosure.

As shown in FIG. 2, a master device 110 includes an input unit (user input interface) 112, a power supply unit 113, a control unit 114, a memory unit 115, a network interface 116 including a Bluetooth interface, a storage 117, an output unit (display unit) 118, and a multi media module 119.

The input unit (user input interface) 112, the power supply unit 113, the control unit 114, the memory unit 115, the network interface 116 including the Bluetooth interface, the storage 117, the output unit (display unit) 118, and the multi media module 119 are functionally connected to each other to perform the method proposed in the present disclosure.

In addition, as shown in FIG. 2, slave devices (#1 and #2) 120 include an input unit (user input interface) 122, a power supply unit 123, a control unit 124, a memory unit 125, a network interface 126 including a Bluetooth interface, a storage 127, an output unit (display unit) 128, a multi media module 129.

The input unit (user input interface) 122, the power supply unit 123, the control unit 124, the memory unit 125, the network interface 126 including the Bluetooth interface, the storage 127, the output unit (display unit) 128, the multi media module 129 are functionally connected to each other to perform the method proposed in the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored. Also, the storages 117 and 127 refer to units that perform a function similar to that of a memory.

The processor 114, 124 refers to a module for controlling an overall operation of the master device 110 or the slave device 120, and controls the server device or the client device in order in order to request the transmission of a message through the Bluetooth interface or other interface and to process a received message.

The processors 114 and 124 may include an application-specific integrated circuit (ASIC), another chipset, a logic circuit, and/or a data processing device.

The memory units 115 and 125 may include a read-only memory (ROM), a random access memory (RAM), a flash memory, a memory card, a storage medium, and/or other storage devices.

The memories 115 and 125 may be internal or external to the processors 114 and 124, and may be connected to the processors 114 and 124 by various well-known means.

The output units 118 and 128 refer to modules for providing device state information and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service.

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet.

Connecting Procedure

A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave.

The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | PDU Name | Channel | Permitted PHYs | | |
|---|---|---|---|---|---|
| | | | LE 1M | LE 2M | LE Coded |
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

Advertising PDU

The following advertising channel PDU types are called advertising PDUs and are used for specific events.
  ADV_IND: a connectable non-directional advertisement event
  ADV_DIREC_IND: a connectable directional advertisement event
  ADV_NONCONN_IND: a non-connectable non-directional advertisement event
  ADV_SCAN_IND: a non-directional advertisement event that may be scanned The PDUs are transmitted by the link layer in the advertising state and are received by the link layer in the scanning state or initiating state.

Scanning PDUs

The advertising channel PDU type below is called a scanning PDU and is used in the status described below.
  SCAN_REQ: transmitted by the link layer in the scanning state and received by the link layer in the advertising state.
  SCAN_RSP: transmitted by the link layer in the advertising state and received by the link layer in the scanning state.

Initiating PDUs

The advertising channel PDU type below is called an initiating PDU.
  CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.
  handle: Address of attribute
  Type: Type of attribute
  Value: Value of attribute
  Permission: Access authority to attribute FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK
Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Isochronous Channel General

In the case of an audio signal, it can be seen that audio streaming data or audio data occurs periodically at an idle event interval.

The audio data occurs periodically (or at specific time intervals) according to its characteristics. Here, a specific time period in which audio data periodically occurs may be expressed as the idle event interval. In each Idle Event Interval, each audio data is transported. In addition, each audio data may be transported through all or part of the Idle Event Interval. When transporting audio streaming data occurring periodically or regularly using the BLE mechanism, advertising and scanning procedures, communication procedures, disconnection procedures, etc. must be performed whenever the occurred audio data is transmitted and received. However, audio data generally occurs periodically, and a latency guarantee for audio data transport is essential regardless of the amount of data.

However, when advertising and scanning procedures, communication procedures, disconnection procedures, etc. must be performed whenever newly occurred audio data is transported, there is a problem in that latency occurs in audio data transport.

The transport of audio data through hearing aids (HA) or headsets can obtain higher energy efficiency when using BLE technology than Bluetooth BR/EDR technology because of the relatively small amount of data, however, as seen above, because advertising and connection, etc. must be performed for each data transport, the Data Channel Process of BLE technology has a large overhead in data transport, and in particular, cannot guarantee Latency Guarantee, which is absolutely necessary for audio data transport.

In addition, since the Data Channel Process of BLE technology aims to transport data occurred in a single only when necessary and in other time domains, and since it aims to increase energy efficiency by inducing Deep Sleep of BLE devices, it can be difficult to apply the Data Channel Process of BLE technology to the transport of periodically occurring audio data.

Definition of Isochronous Channels and Related Mechanisms

A new channel, that is, an isochronous channel, is defined to transport data occurring periodically using BLE technology.

The isochronous channel is a channel used to transport isochronous data between devices (e.g. Conductor-Member) using an isochronous stream.

The isochronous data refers to data that is periodically or regularly transported at specific time intervals.

That is, the isochronous channel may represent a channel through which periodically occurring data such as audio data or voice data is transmitted and received in the BLE technology.

The isochronous channel may be used to transmit and receive audio data with a single member, a set of one or more coordinated members, or multiple members.

In addition, the isochronous channel corresponds to a flushing channel that can be used to transmit and receive an isochronous stream such as audio streaming or important data in another time domain.

When services such as games are provided using Bluetooth low energy (BLE), connection between slave devices, which are game controllers, is established. In this instance, Data on user input inputted to the slave device, which is the game controller, is transmitted to a master device which is a game machine body. The user input may be a button, a joystick motion, etc. that a user inputs to the slave device that is the game controller.

When services such as games are provided using Bluetooth low energy, if the slave device that has established the connection with the master device is a wireless controller, the same method as in the existing USB wired connection may be used for data transmission and reception between the master device and the slave device. More specifically, in the existing USB wired connection, a USB HID host device (game machine) periodically transmits a poll to a USB HID device (controller), and the USB HID device (controller) reports input data based on the reception of the poll. In this instance, a polling rate may be set in such a way that the USB HID host device sets one of various setting values supported by the USB HID device to the USB HID device when connection between the two devices is established. The various setting values supported by the USB HID device may have values such as 1 ms, 2 ms, 4 ms, and 10 ms. However, when services such as games are provided using Bluetooth low energy, the required latency may vary depending on a type of content provided by the service. More specifically, FPS games, fighting games, etc. are sensitive to latency and may require a fast polling rate, and on the other hand, casual games and turn-based games such as chess are insensitive to latency and may not require a fast polling rate. According to the current Bluetooth technology, the value of the polling rate set to the master device and the slave device when establishing the Bluetooth low energy connection is continuously maintained as an initially set value unless there is a reconfiguration process involving a process such as connection release between the two devices. In this instance, even if the content provided through the Bluetooth service is a latency-insensitive game, a fast polling rate value may be set for the master device and the slave device. In this case, the number of wireless transmissions between the master device and the slave device may increases, and as a result, there may occur a problem in that battery usage time of the slave device, which is a wireless HID device, is reduced.

In order to solve the above problem, the present disclosure proposes a method of configuring a data transmission period of the slave device based on a type of content of gaming service that the slave device, which is the game controller, receives from the master device. Based on the method proposed in the present disclosure, the battery usage time of the slave device, which is the wireless game controller, may be increased.

More specifically, the present disclosure proposes a method of configuring a data transmission period with a response speed sufficient for menu navigation when the slave device which is the game controller and the master device which is the game machine body are initially connected. The present disclosure also proposes a method of pre-configuring and storing a preferred (recommended) data transmission period for each type of content provided by game service. Here, setting values may be retrieved by game name through an Internet server. The present disclosure also proposes a method of configuring a data transmission period by comparing a preferred/recommended data transmission period (polling rate) value set for each content type with a data transmission period value supported by a slave device when the game service provision is started by content selection of a user. The present disclosure also proposes a method of automatically configuring a data transmission period without a separate input of a user, as long as a master device, which is a game machine, is powered on, each time a type of content provided by the game service is changed. Through the above method, the battery saving efficiency of a wireless HID device, which is the slave device, can be increased.

Before describing the methods proposed in the present disclosure, technologies for helping the understanding of the methods proposed in the present disclosure are first described.

FIG. 6 illustrates an example of a data transmission/reception method in a BR/EDR scheme for helping understanding of a method described in the present disclosure. More specifically, FIG. 6 illustrates a BR/EDR data transmission/reception time duration from a master device perspective. The time duration may be a slot. In the BR/EDR, lengths of one transmission (Tx) slot and one reception (Rx) slot use a fixed time length of 625 us. In FIG. 6, reference numeral 610 denotes a time duration in which the master device transmits data to the slave device, and reference numeral 620 denotes a time duration in which the master device receives data from the slave device.

FIG. 7 illustrates another example of a data transmission/reception method in a BR/EDR scheme for helping understanding of a method described in the present disclosure. In FIG. 7, reference numeral 710 denotes a time duration in which the master device transmits data to the slave device, and reference numeral 720 denotes a time duration in which the master device receives data from the slave device. In FIG. 7, a length of one Tx/Rx slot is fixed to 625 us, and data transmission of each of the master device/the slave device is performed in a time division multiplexing (TDM) scheme. In this case, the data transmission of each of the master device/the slave device may be performed during time durations of 1, 3, and 5-slot sizes. Further, the data transmission of the master device to the slave device may be performed in even slots, and data reception of the master device from the slave device may be performed in odd slots. Referring to the reference numeral 710 of FIG. 7, for example, the data transmission of the master device to the slave device may be performed during time durations of 1-slot size and 5-slot size. Further, referring to the reference numeral 720 of FIG. 7, for example, the data reception of the master device from the slave device may be performed during time durations of 1-slot size and 3-slot size.

FIG. 8 illustrates an example of a data packet format for data transmission/reception in a BR/EDR scheme for helping understanding of a method described in the present disclosure. Referring to FIG. 8, it can be seen that a data packet format in the BR/EDR scheme is configured to include an ACCESS CODE field, a HEADER field, and a PAYLOAD field.

FIG. 9 illustrates another example of a data transmission/reception method in a BR/EDR scheme for helping understanding of a method described in the present disclosure. More specifically, FIG. 9 illustrates an example of a data transmission/reception method of the BR/EDR scheme based on a Synchronous Connection Oriented (SCO) link. For the data transmission/reception of the BR/EDR scheme based on the SCO link, HV1(1/3 FEC), HV2(2/3 FEC), and HV3(No FEC) packets may be used. SCO logical transport in the data transmission/reception of the BR/EDR scheme based on the SCO link may be transmission between symmetric points between the master device and the slave device. The data transmission/reception based on the SCO link may be preferably used for voice communication.

FIG. 10 illustrates another example of a data transmission/reception method in a BR/EDR scheme for helping understanding of a method described in the present disclosure. More specifically, FIG. 10 illustrates an example of a data transmission/reception method of the BR/EDR scheme based on an Asynchronous Connection-Less (ACL) link. For the data transmission/reception method of the BR/EDR scheme based on the ACL link, the master device may exchange a data packet with all the slave devices per slot in a non-reserved slot for the SCO logical transport. A packet exchange connection between (i) the master slave and (ii) all active slaves participating in a piconet may be provided based on the ACL logical transport. Further, both asynchronous and isochronous services may be supported based on the ACL link. Only a single ACL logical transport has to exist between two devices transmitting and receiving data based on the ACL link. Packet retransmission may be applied to the ACK packet in order to guarantee data integrity.

FIG. 11 illustrates another example of a data transmission/reception method in a BR/EDR scheme for helping understanding of a method described in the present disclosure. In the data transmission/reception in the BR/EDR scheme, since an asynchronous channel is used for data transmission of the slave device which is the game controller, it is difficult to guarantee that a controller of the slave device transmits data depending on a polling period decided by a host of the slave device.

In FIG. 11, reference numerals 1110 to 1150 denote examples where the polling periods are 1.25 ms, 2.5 ms, 5 ms, 10 ms, and 12.5 ms, respectively. Since a minimum slot length of the BR/EDR is 625 us, a sum of lengths of slots for transmitting a poll and data may be at least 625 us×2=1.25 ms. When the poll and the data are transmitted based on a minimum period of 1.25 ms, the master device may transmit data 800 times per second. However, in the asynchronous transmission method, even if a transmission period is fixed at the host, the data is transmitted by a best effort method in the controller, so it is difficult to transmit the data at a regular time interval in an air interface. That is, referring to the reference numeral 1110 of FIG. 11, the pole and the data are configured to be transmitted at a period of 1.25 ms, but a time space in which the poll and the data are not transmitted is generated, and as a result, a jitter variation occurs. Referring to the reference numerals 1120 to 1150 of FIG. 11, it may be confirmed that the pole and the data may be transmitted at periods of 2.5 ms, 5 ms, 10 ms, and 12.5 ms in order to use other traffic, but the examples of the reference numerals 1120 to 1150 of FIG. 11 have the same problem as the example of the reference numeral 1110.

FIG. 12 illustrates an example of using a game content using Bluetooth low energy for helping understanding of a method described in the present disclosure.

1210: Referring to FIG. 12, the slave device which is the game controller is wiredly or wirelessly connected to the master device which is the game machine body. Here, the master device may be a machine such as a PC or a game machine. When the slave device is wiredly connected to the master device, the two devices may be connected by a USB method and may follow a poll/data transmission method according to a USB HID standard. A polling period of the wired USB method may be set to 2 ms, 5 ms, and 10 ms from at least 1 ms. When the slave device is wirelessly connected to the master device, the two devices may be connected by a Bluetooth method and may follow a poll/data transmission method according to the Bluetooth HID standard. A polling period of the Bluetooth method may be set to 2.5 ms, 5 ms, 10 ms, and 12.5 ms from at least 1.25 ms.

1220: An input lag for the slave device which is the game controller may be determined based on (i) sensing delay and (ii) polling delay which are hardware elements, and (i) OS delay and (ii) game app delay which are software elements. Here, the sensing delay refers to a time it takes for the slave device which is a microcontroller (MC) to recognize a user input value that is input to the slave device. Further, the polling delay refers to a time it takes for user input data to be transmitted from the slave device to the master device through the USB or Bluetooth. Further, the OS delay refers to a time it takes for a PC or game machine OS to read a controller reception buffer value, and the game app delay refers to a time it takes for the game SW to read OS data.

1230: Referring to reference numeral 1230 of FIG. 12, it can be seen that in a wireless Bluetooth method, the polling delay exerts a largest influence on the input delay.

FIG. 13 illustrates an example of a protocol stack to which a method described in the present disclosure is applicable. Referring to FIG. 13, a protocol stack to which the method described in the present disclosure is applicable may include a physical transport(s), a physical channel(s), a physical link(s), a logical transport(s), and a logical link(s). In the present disclosure, the physical channel may mean a synchronized Bluetooth baseband-compliant RF hopping sequence.

The piconet may mean a set of Bluetooth devices sharing the same physical channel defined by the master parameters (clock and BD_ADDR).

The physical link may be a baseband level link between two devices configured using paging. The physical link may include a transmission slot sequence of a physical channel alternating between a transmission slot of the master device and a transmission slot of the slave device.

Further, an LE isochronous physical channel may have a pseudo-random sequence of the PHY channel, and three additional parameters provided by a master or non-link type broadcaster as a feature. A first parameter may be a channel map representing a PHY channel set, and a second parameter may be a pseudo random number used as an index for all sets of the PHY channel. A third parameter may be a timing of a first data packet. A timing of a first packet of CIS may be provided to a link layer message transmitted in an ACL link linked by the master in a CIS setting step. A timing of a first packet of BIS may be referenced in a periodic advertising event related to the BIS.

FIG. 14 illustrates an example of a data packet format capable of being used in a protocol stack to which a method described in the present disclosure is applicable. Referring to FIG. 14, a data packet format capable of being used in a protocol stack to which a method described in the present disclosure is applicable includes a preamble field, an access address field, a PDU header field, a PDU payload field, MIC, and a CRC field. The uses of the respective fields are illustrated in FIG. 14.

FIG. 15 illustrates an example of a data transmission/reception method to which a method described in the present disclosure is applicable. More specifically, FIG. 15 is a diagram related to a data transmission method through the LE isochronous channel. FIG. 15(*a*) is related to data transmission of a unicast scheme through a connected isochronous channel (CIS), and FIG. 15(*b*) is related to data transmission of a broadcast scheme through a broadcast isochronous channel (BIS).

The LE isochronous channel is a channel that guarantees isochronism, and it may be guaranteed that a controller of the Bluetooth device transmits data according to a polling period set by a host of the Bluetooth device through the LE isochronous channel. sub_interval similar to the slot defined in the BR/EDR scheme may be used in the LE isochronous channel.

sub_interval of a unicast channel based on the CIS may have a length of at least 400 us and may be adjusted in units of 30 us. sub_interval of a broadcast channel based on the BIS may have a length of at least 300 us and may be adjusted in units of 30 us.

ISO_interval may be set to a length longer than sub_interval for managing a transmission buffer. When a time as long as the ISO_interval elapsed, the transmission buffer may be flushed, and new data may be transmitted.

In the data transmission of the unicast scheme, bidirectional communication between the master device and the slave device may be performed using the connected isochronous channel (CIS). In the CIS, a connected device may transmit isochronous data even in any direction. The size of the data may be fixed or variable, and there may be a frame or no frame. The isochronous data may be transmitted in an LE-S or LE-F logical link by using the CIS logical transport. Each CIS should be connected to the ACL. In the CIS, since (i) transmission of packets having various sizes and (ii) transmission of one or more packets in each isochronous event are supported, various data rates may be supported. Data traffic may be transmitted/received between the devices unidirectionally or bidirectionally. In the CIS, an acknowledgment protocol for enhancing reliability of packet delivery may be defined.

In the data transmission of the broadcast method, unidirectional communication between the master device and the slave device may be performed by using the broadcast isochronous channel (BIS). That is, referring to FIG. 15(b), in the data transmission of the broadcast method, data may be broadcasted only in (i) a direction from the slave device to the master device or (ii) a direction from the master device to the slave device. The BIS is a logical transport which allows the device to transmit the isochronous data. The isochronous data may have a frame or no frame. In the BIS, since (i) transmission of packets having various sizes and (ii) transmission of one or more packets in each isochronous event are supported, various data rates may be supported. The data traffic may be performed unidirectionally in the broadcasting device. As a result, in the BIS, the acknowledgment protocol is not defined, and it is difficult to intrinsically guarantee the reliability of broadcast isochronous traffic. The BIS may support multi-retransmission in order to enhance the reliability of the packet delivery.

In the LE isochronous channel, the isochronism of data transmission/reception is guaranteed, and the master device and the slave device share timing for data transmission/reception. Therefore, a master poll required for timing synchronization for the data transmission/reception between the master device and the slave device in the asynchronous channel does not need to be transmitted to the slave device.

The following describes a method of configuring a data transmission period of a slave device based on a type of content of gaming service proposed in the present disclosure. For convenience of explanation, a wireless HID host device providing Bluetooth low energy game service, etc. is commonly referred to as a master device, and a wireless HID device receiving the Bluetooth low energy game service, etc. is commonly referred to as a slave device.

FIG. 16 is a flowchart illustrating an example of performing a method described in the present disclosure. For convenience of explanation, although the following describes operations performed between the master device and the slave device from a perspective of the master device, it is not interpreted that the method described in the present disclosure is limited to the operation of the master device.

S1610: First, the master device and the slave device form the connection.

S1620: Next, the master device transmits, to the slave device, a read request message requesting reading of information on various characteristics supported by the slave device. The various characteristics may include a data transmission period supported by the slave device, a device name, the number of input buttons mounted on the slave device, the number of joystick axes mounted on the slave device, and the like. The data transmission period may be time from a time point at which the slave device transmits one specific data to the master device to a time point at which the slave device transmits next data to the master device (if there is next data). In this instance, the master device may transmit a poll to the slave device in consideration of the data transmission period of the slave device. That is, a poll transmission period of the master device may be determined based on the data transmission period of the slave device. For example, the poll transmission period of the master device may be set to the same value as the data transmission period of the slave device.

S1630: Subsequently, the master device receives, from the slave device, a read response message containing information on the various characteristics of the slave device. The read response message may include information on a data transmission period supported by the slave device, a device name, the number of input buttons mounted on the slave device, the number of joystick axes mounted on the slave device, and the like.

S1640: Next, the master device receives a user's selection of one of contents related to a game service provided by the master device via a user interface (UI). More specifically, the user may input, to the slave device, a user input for selecting one of the contents related to the game service provided by the master device, and the slave device may transmit, to the master device, a message indicating selection of the one content based on the user input.

S1650: Subsequently, the master device transmits, to the slave device, a message for configuring one specific data transmission period among at least one data transmission period supported by the slave device to the slave device based on (i) a type of the selected content and (ii) information on the data transmission period that is supported by the slave device and is acquired from the read response message. In this instance, the data transmission period of the slave device may be configured based on the message for configuring the data transmission period to the slave device.

S1660: Subsequently, after game service contents of the master device start to be provided in earnest, the master device and the slave device may periodically perform the poll/data transmission and reception based on the configured data transmission period. In FIG. 16, reference numeral 1610 denotes a poll transmitted by the master device to the slave device, and reference numeral 1620 denotes an operation in which the slave device transmits data to the master device only if there is data after the slave device receives the poll from the master device. The operation in which the slave device transmits data to the master device only if there is data may be referred to as reporting/report in the present disclosure. Further, reference numeral 1630 denotes an operation, corresponding to a case where there is no data after the slave device receives the poll from the master device, in which transmission of data of the slave device to the master device is omitted. The slave device recognizes that data transmission should be performed at regular periods based on the data transmission period configured to the slave device, but may omit data transmission if data to be transmitted to the master device does not exist. The data may be control data generated based on the user input, and the fact that the control data does not exist may mean that there is no user input inputted to the slave device at the corresponding time point.

FIG. 17 is a flowchart illustrating another example of performing a method described in the present disclosure. For convenience of explanation, although the following describes operations performed between the master device and the slave device from a perspective of the master device, it is not interpreted that the method described in the present disclosure is limited to the operation of the master device.

S1710: First, the master device and the slave device form the connection. Step S1710 may include steps S1711 and S1712 described below.

S1711: Next, the master device transmits, to the slave device, a read request message requesting reading of information on various characteristics supported by the slave device. The various characteristics may include a data transmission period supported by the slave device, a device name, the number of input buttons mounted on the slave device, the number of joystick axes mounted on the slave device, and the like. The data transmission period may be time from a time point at which the slave device transmits one specific data to the master device to a time point at which the slave device transmits next data to the master device (if there is next data). In this instance, the master device may transmit a poll to the slave device in consideration of the data transmission period of the slave device. That is, a poll transmission period of the master device may be determined based on the data transmission period of the slave device.

S1712: Subsequently, the master device receives, from the slave device, a read response message containing information on the various characteristics of the slave device. The read response message may include information on a data transmission period supported by the slave device, a device name, the number of input buttons mounted on the slave device, the number of joystick axes mounted on the slave device, and the like.

S1720: Next, the master device and the slave device form Bluetooth low energy isochronous channel connection.

S1730: Next, the master device receives a user's selection of one of contents related to a game service provided by the master device via a user interface (UI), and configures the data transmission period based on a type of the selected content. More specifically, the user may input, to the slave device, a user input for selecting one of the contents related to the game service provided by the master device, and the slave device may transmit, to the master device, a message indicating selection of the one content based on the user input. Subsequently, the master device may transmit, to the slave device, a message for configuring one specific data transmission period among at least one data transmission period supported by the slave device to the slave device based on (i) a type of the selected content and (ii) information on the data transmission period that is supported by the slave device and is acquired from the read response message.

S1740: Subsequently, after game service contents of the master device start to be provided in earnest, the master device and the slave device may periodically perform the poll/data transmission and reception based on the configured data transmission period. The step S1740 may be performed based on a Bluetooth BR/EDR method formed in the step S1710 or a method using the Bluetooth low energy isochronous channel formed in the step S1720. In FIG. 17, reference numeral 1710 denotes a poll transmitted by the master device to the slave device, and reference numeral 1720 denotes an operation in which the slave device transmits data to the master device only if there is data after the slave device receives the poll from the master device. The operation in which the slave device transmits data to the master device only if there is data may be referred to as reporting/report in the present disclosure. Further, reference numeral 1730 denotes an operation, corresponding to a case where there is no data after the slave device receives the poll from the master device, in which transmission of data of the slave device to the master device is omitted. If the step S1740 is performed based on the method using the Bluetooth low energy isochronous channel, a poll 1710 transmitted by the master device to the slave device may be omitted. Regarding the reference numeral 1730, the slave device recognizes that data transmission should be performed at regular periods based on the data transmission period configured to the slave device, but may omit data transmission if data to be transmitted to the master device does not exist. The data may be control data generated based on the user input, and the fact that the control data does not exist may mean that there is no user input inputted to the slave device at the corresponding time point.

FIG. 18 is a flowchart illustrating another example of performing a method described in the present disclosure. For convenience of explanation, although the following describes operations performed between the master device and the slave device from a perspective of the master device, it is not interpreted that the method described in the present disclosure is limited to the operation of the master device.

Although not illustrated in FIG. 18, the Bluetooth connection may be formed between the master device and the slave device in order to perform an operation described below.

S1810: The master device transmits, to the slave device, a read request message requesting reading of information on various characteristics supported by the slave device. The various characteristics may include a data transmission period supported by the slave device, a device name, the number of input buttons mounted on the slave device, the number of joystick axes mounted on the slave device, and the like. The data transmission period may be time from a time point at which the slave device transmits one specific data to the master device to a time point at which the slave device transmits next data to the master device (if there is next data). In this instance, the master device may transmit a poll to the slave device in consideration of the data transmission period of the slave device. That is, a poll transmission period of the master device may be determined based on the data transmission period of the slave device.

S1820: Subsequently, the master device receives, from the slave device, a read response message containing information on the various characteristics of the slave device. The read response message may include information on a data transmission period supported by the slave device, a device name, the number of input buttons mounted on the slave device, the number of joystick axes mounted on the slave device, and the like.

S1830: Next, the master device receives a user's selection of one of contents related to a game service provided by the master device via a user interface (UI), and configures the data transmission period based on a type of the selected content. In this instance, information on a recommendation data transmission period for each of at least one content related to the game service provided by the master device may be pre-configured to the master device. The information pre-configured to the master device may be referred to as data transmission period mapping information. The data transmission period mapping information may relate to a mapping relationship between a title of the content and a specific recommendation data transmission period value. When the data transmission period is configured based on the type of the selected content, the data transmission period mapping information may be used. The data transmission period mapping information may be stored in a memory of the master device.

S1831: The step S1831 may be performed when the transmission cycle mapping information for the content selected by the user is pre-stored in the master device. More specifically, when information on the recommendation data transmission period for the type of the content selected in the step S1830 is stored in the master device, the master device may perform the data transmission period configuration for the slave device based on (i) the data transmission period mapping information and (ii) information on the data transmission period that is supported by the slave device and is acquired in the step S1820.

S1832: The step S1832 may be performed when the transmission period mapping information for the content selected by the user is not pre-stored in the master device. More specifically, when the information on the recommendation data transmission period for the type of the content selected in the step S1830 is not stored in the master device, the master device may transmit, to a server providing contents of the game service to a master equipment, a message requesting information on the recommendation data transmission period for the content selected by the user. The server may be an internet server, and the master device may receive a cloud gaming service from the server. Subsequently, the master device may configure the data transmission period for the slave device based on (i) information on the recommendation data transmission period received from the server and (ii) information on the data transmission period that is supported by the slave device and is acquired in the step S1820.

S1840: Subsequently, after game service contents of the master device start to be provided in earnest, the master device and the slave device may periodically perform the poll/data transmission and reception based on the configured data transmission period. In FIG. 18, reference numeral 1810 denotes a poll transmitted by the master device to the slave device, and reference numeral 1820 denotes an operation in which the slave device transmits data to the master device only if there is data after the slave device receives the poll from the master device. The operation in which the slave device transmits data to the master device only if there is data may be referred to as reporting/report in the present disclosure. Further, reference numeral 1830 denotes an operation, corresponding to a case where there is no data after the slave device receives the poll from the master device, in which transmission of data of the slave device to the master device is omitted. If the step S1840 is performed based on the method using the Bluetooth low energy isochronous channel, a poll 1810 transmitted by the master device to the slave device may be omitted. Regarding the reference numeral 1830, the slave device recognizes that data transmission should be performed at regular periods based on the data transmission period configured to the slave device, but may omit data transmission if data to be transmitted to the master device does not exist. The data may be control data generated based on the user input, and the fact that the control data does not exist may mean that there is no user input inputted to the slave device at the corresponding time point.

FIGS. 19 and 20 illustrate another example of performing a method described in the present disclosure. FIGS. 19 and 20 may relate to an operation performed based on the Bluetooth BR/EDR method. For convenience of explanation, although the following describes operations performed between the master device and the slave device from a perspective of the master device, it is not interpreted that the method described in the present disclosure is limited to the operation of the master device.

First, referring to FIG. 19, although not illustrated in FIG. 19, Bluetooth connection may be formed between the master device and the slave device in order to perform an operation described below.

S1910: The master device transmits, to the slave device, a read request message requesting reading of information on various characteristics supported by the slave device. The various characteristics may include a data transmission period supported by the slave device, a device name, the number of input buttons mounted on the slave device, the number of joystick axes mounted on the slave device, and the like. The data transmission period may be time from a time point at which the slave device transmits one specific data to the master device to a time point at which the slave device transmits next data to the master device (if there is next data). In this instance, the master device may transmit a poll to the slave device in consideration of the data transmission period of the slave device. That is, a poll transmission period of the master device may be determined based on the data transmission period of the slave device.

S1920: Subsequently, the master device receives, from the slave device, a read response message containing information on the various characteristics of the slave device. The read response message may include information on a data transmission period supported by the slave device, a device name, the number of input buttons mounted on the slave device, the number of joystick axes mounted on the slave device, and the like.

S1930: Next, the master device receives a user's selection of one of contents related to a game service provided by the master device via a user interface (UI), and configures the data transmission period based on a type of the selected content. In this instance, information on a recommendation data transmission period for each of at least one content related to the game service provided by the master device may be pre-configured to the master device. The information pre-configured to the master device may be referred to as data transmission period mapping information. The data transmission period mapping information may relate to a mapping relationship between a title of the content and a specific recommendation data transmission period value. When the data transmission period is configured based on the type of the selected content, the data transmission period mapping information may be used. The data transmission period mapping information may be stored in a memory of the master device. The configuration of the data transmission period in step S1940 may be performed as described in the steps S1831 and S1832 of FIG. 18.

S1940: Subsequently, after game service contents of the master device start to be provided in earnest, the master device and the slave device may periodically perform the poll/data transmission and reception based on the configured data transmission period. In FIG. 19, reference numeral 1910 denotes a poll transmitted by the master device to the slave device, and reference numeral 1920 denotes an operation in which the slave device transmits data to the master device only if there is data after the slave device receives the poll from the master device. The operation in which the slave device transmits data to the master device only if there is data may be referred to as reporting/report in the present disclosure. Further, reference numeral 1930 denotes an operation, corresponding to a case where there is no data after the slave device receives the poll from the master device, in which transmission of data of the slave device to the master device is omitted. Regarding the reference numeral 1930, the slave device recognizes that data transmission should be performed at regular periods based on the data transmission period configured to the slave device, but may omit data transmission if data to be transmitted to the master device does not exist. The data may be control data generated based on the user input, and the fact that the control data does not exist may mean that there is no user input inputted to the slave device at the corresponding time point.

Next, referring to FIG. 20, although not illustrated in FIG. 20, the Bluetooth connection may be formed between the master device and the slave device in order to perform an operation described below, and the master device may transmit, to the slave device, a read request message for reading of various characteristics supported by the slave device.

S2010: The master device receives, from the slave device, a read response message containing information on the various characteristics of the slave device. The read response message may include information on a data transmission period supported by the slave device, a device name, the number of input buttons mounted on the slave device, the number of joystick axes mounted on the slave device, and the like.

S2020: Next, the master device receives a user's selection of one content (game A) of contents related to a game service provided by the master device via a user interface (UI), and configures the data transmission period based on a type of the selected content. In this instance, information on a recommendation data transmission period for each of at least one content related to the game service provided by the master device may be pre-configured to the master device. The information pre-configured to the master device may be referred to as data transmission period mapping information. The data transmission period mapping information may relate to a mapping relationship between a title of the content and a specific recommendation data transmission period value. When the data transmission period is configured based on the type of the selected content, the data transmission period mapping information may be used. The data transmission period mapping information may be stored in a memory of the master device. Here, the game A may be a content requiring a fast data transmission period, and the configuration of the data transmission period in the step S2020 may be performed as described in the steps S1831 and S1832 of FIG. 18.

S2030: Subsequently, after game service contents of the master device start to be provided in earnest, the master device and the slave device may periodically perform the poll/data transmission and reception based on the configured data transmission period. In FIG. 20, reference numeral 2010 denotes a poll transmitted by the master device to the slave device, and reference numeral 2020 denotes an operation in which the slave device transmits data to the master device only if there is data after the slave device receives the poll from the master device. The operation in which the slave device transmits data to the master device only if there is data may be referred to as reporting/report in the present disclosure. Further, reference numeral 2030 denotes an operation, corresponding to a case where there is no data after the slave device receives the poll from the master device, in which transmission of data of the slave device to the master device is omitted. Regarding the reference numeral 2030, the slave device recognizes that data transmission should be performed at regular periods based on the data transmission period configured to the slave device, but may omit data transmission if data to be transmitted to the master device does not exist. The data may be control data generated based on the user input, and the fact that the control data does not exist may mean that there is no user input inputted to the slave device at the corresponding time point.

S2040: Subsequently, when a type of the selected content is changed (game B), the master device reconfigures the data transmission period of the slave device based on the changed type of the content. More specifically, the master device may transmit, to the slave device, a message for reconfiguring the data transmission period of the slave device based on the changed type of the content. Here, the change of the selected content may be performed in such a way that the master device receives, from the slave device, a message indicating selection of different content from the pre-selected content among at least one content related to a service provided by the master device, and the content provided by the master device is changed based on the received message. In the step S2040, the game B may be a content requiring a slow data transmission period, and the reconfiguration of the data transmission period in step S2040 may be performed as described in the steps S1831 and S1832 of FIG. 18.

S2050: Subsequently, the master device and the slave device may periodically perform the poll/data transmission and reception based on the changed data transmission period. More specifically, the master device may transmit the poll/receive data to/from the slave device based on the data transmission period reconfigured based on the message for reconfiguring the data transmission period of the slave device.

A channel through which data is transmitted and received in the steps S2030 and S2050 of FIG. 20 may be an asynchronous channel. According to the method described in FIG. 20, there is an effect that the data transmission period (polling rate) can be automatically configured to an optimal battery saving model without a separate input of the user as long as the master device is powered on, each time a type of content provided is changed.

FIG. 21 illustrates an example of a method of constructing data transmission period mapping information described in the present disclosure.

In FIG. 21, reference numerals 2110 to 2150 denote examples of a method of configuring a data transmission period when a recommended/preferred data transmission period, a supportable data transmission period of the slave device, and a supportable data transmission period of the master device are differently configured. As illustrated in FIG. 21, data transmission period configuration for a specific content may be performed based on a value closest to a recommendation data transmission period value for the specific content represented by the data transmission period mapping information among at least one common value commonly included in (i) a data transmission period supported by the master device and (ii) at least one data transmission period supported by the slave device.

Different operation modes may be supported within one content. In this case, the data transmission period mapping information may further include mode based recommendation data transmission period information for each of different operation modes provided by the one content. For example, when three different operation modes are supported within one content, a different recommendation data transmission period may be configured for each of the three different operation modes. When the data transmission period mapping information further includes mode based recommendation data transmission period information, the master device and the slave device may additionally perform the following operation.

First, the master device may receive, from the slave device, a message indicating an operation mode change in a specific content selected from the user. Afterwards, the master device may transmit, to the slave device, a message for configuring the data transmission period of the slave device based on (i) the changed operation mode, (ii) information on the at least one data transmission period supported by the slave device, and (iii) the mode based recommendation data transmission period information.

FIGS. 22 and 23 are flowcharts illustrating another example of performing a method described in the present disclosure.

A difference between FIGS. 22 and 23 and FIGS. 19 and 20 is that there is no need for a master poll that has been required for an asynchronous channel since data transmission/reception is performed using a Bluetooth low energy isochronous channel on which transmission timing is shared between the master device and the slave device. In this case, since the poll is omitted, the data transmission period may be referred to as a report rate not the polling rate.

First, referring to FIG. 22, although not illustrated in FIG. 22, Bluetooth connection may be formed between the master device and the slave device in order to perform an operation described below.

S2010: First, the master device and the slave device form the connection. In the step S2010, the operations of the steps S1711 and S1712 described with reference to FIG. 17 may be performed.

S2020: Next, the master device and the slave device form Bluetooth low energy isochronous channel connection.

S2030/S2040: Next, the master device receives a user's selection of one of contents related to a game service provided by the master device via a user interface (UI), and configures the data transmission period based on a type of the selected content. In this instance, information on a recommendation data transmission period for each of at least one content related to the game service provided by the master device may be pre-configured to the master device. The information pre-configured to the master device may be referred to as data transmission period mapping information. The data transmission period mapping information may relate to a mapping relationship between a title of the content and a specific recommendation data transmission period value. When the data transmission period is configured based on the type of the selected content, the data transmission period mapping information may be used. The data transmission period mapping information may be stored in a memory of the master device. The configuration of the data transmission period in the step S2030/S2040 may be performed as described in the steps S1831 and S1832 of FIG. 18.

S2250: Subsequently, after game service contents of the master device start to be provided in earnest, the master device and the slave device may periodically perform the data transmission and reception based on the configured data transmission period. In FIG. 22, reference numeral 2210 denotes an operation in which the slave device transmits data to the master device only if there is data. The operation in which the slave device transmits data to the master device only if there is data may be referred to as reporting/report in the present disclosure. Further, reference numeral 2220 denotes an operation, corresponding to a case where there is no data, in which transmission of data of the slave device to the master device is omitted. Regarding the reference numeral 2220, the slave device recognizes that data transmission should be performed at regular periods based on the data transmission period configured to the slave device, but may omit data transmission if data to be transmitted to the master device does not exist. The data may be control data generated based on the user input, and the fact that the control data does not exist may mean that there is no user input inputted to the slave device at the corresponding time point.

Next, referring to FIG. 23, although not illustrated in FIG. 23, the Bluetooth connection/isochronous channel may be formed between the master device and the slave device in order to perform an operation described below, and the master device may transmit, to the slave device, a read request message for reading of various characteristics supported by the slave device and may receive a read response message.

S2310/S2320: Next, the master device receives a user's selection of one content (game A) of contents related to a game service provided by the master device via a user interface (UI), and configures the data transmission period based on a type of the selected content. In this instance, information on a recommendation data transmission period for each of at least one content related to the game service provided by the master device may be pre-configured to the master device. The information pre-configured to the master device may be referred to as data transmission period mapping information. The data transmission period mapping information may relate to a mapping relationship between a title of the content and a specific recommendation data transmission period value. When the data transmission period is configured based on the type of the selected content, the data transmission period mapping information may be used. The data transmission period mapping information may be stored in a memory of the master device. Here, the game A may be a content requiring a fast data transmission period, and the configuration of the data transmission period in the step S2310/S2320 may be performed as described in the steps S1831 and S1832 of FIG. 18.

S2330: Subsequently, after game service contents of the master device start to be provided in earnest, the master device and the slave device may periodically perform the data transmission and reception based on the configured data transmission period. In FIG. 23, reference numeral 2310 denotes an operation in which the slave device transmits data to the master device only if there is data. The operation in which the slave device transmits data to the master device only if there is data may be referred to as reporting/report in the present disclosure. Further, reference numeral 2320 denotes an operation, corresponding to a case where there is no data, in which transmission of data of the slave device to the master device is omitted. Regarding the reference numeral 2320, the slave device recognizes that data transmission should be performed at regular periods based on the data transmission period configured to the slave device, but may omit data transmission if data to be transmitted to the master device does not exist. The data may be control data generated based on the user input, and the fact that the control data does not exist may mean that there is no user input inputted to the slave device at the corresponding time point.

S2340: Subsequently, when a type of the selected content is changed (game B), the master device reconfigures the data transmission period of the slave device based on the changed type of the content. More specifically, the master device may transmit, to the slave device, a message for reconfiguring the data transmission period of the slave device based on the changed type of the content. Here, the change of the selected content may be performed in such a way that the master device receives, from the slave device, a message indicating selection of different content from the pre-selected content among at least one content related to a service provided by the master device, and the content provided by the master device is changed based on the received message. In the step S2340, the game B may be a content requiring a slow data transmission period, and the reconfiguration of the data transmission period in step S2340 may be performed as described in the steps S1831 and S1832 of FIG. 18.

S2350: Subsequently, the master device and the slave device may periodically perform the data transmission and reception based on the changed data transmission period. More specifically, the master device may receive data from the slave device based on the data transmission period reconfigured based on the message for reconfiguring the data transmission period of the slave device.

According to the method described in FIG. 23, there is an effect that the data transmission period (polling rate) can be automatically configured to an optimal battery saving model without a separate input of the user as long as the master device is powered on, each time a type of content provided is changed.

FIG. 24 illustrates another example of performing a method described in the present disclosure.

S2410: First, the master device and the slave device may discover each other and form the connection.

S2420: Next, the master device and the slave device may form a connection for isochronous data transmission. In this case, the connection for isochronous data transmission may be unicast CIS.

S2430: Next, when there is input data of the user (e.g., a controller button input, a joystick input, etc.), the slave device which is a game controller may transmit data to the master device based on a notification method in a slave data transmission duration. In this case, since a controller of the slave device knows a slave data transmission timing, the master device may not transmit a poll to the slave device. Therefore, when there is input data of the user, the slave device may transmit the input data to the master device without the poll reception from the master device. On the contrary, when there is no input data of the user, the slave device may not perform data transmission to the master device in the slave data transmission duration without the poll reception from the master device. Through this method, there is an effect that the slave device does not need to manage an Rx buffer for receiving data (poll) from the master device. Further, there is an effect that the master device does not need to manage timeout for reception of data that the slave device transmits to the master device within any sub_interval after the poll transmission.

FIG. 25 illustrates an example of isochronous data transmission of a slave device. More specifically, FIG. 25 illustrates an example of an operation in which a user input is input to one slave device, and isochronous data for the input user input is transmitted on the LE isochronous channel by the slave device. In FIG. 25, reference numeral 2510 denotes an operation in which the input data of the user is input to the slave device, and reference numeral 2520 denotes an operation in which the slave device transmits the input data on the LE isochronous channel. In FIG. 25, transmission of the isochronous data on the LE isochronous channel is performed based on a periodically allocated transmission duration. The transmission duration includes (i) a transmission duration (a first transmission duration) 2511 for data transmission from the master device to the slave device, and (ii) a transmission duration (a second transmission duration) 2521 for data transmission from the slave device to the master device.

Referring to FIG. 25, when there is input data of the user in the transmission duration, the slave device performs transmission of isochronous data for the input data in a transmission duration receiving the input data. On the contrary, when there is no input data of the user in the transmission duration, the slave device omits transmission of isochronous data for the input data in a transmission duration receiving the input data.

FIG. 26 is a flowchart illustrating an example where a method of transmitting data in a short-range wireless communication system described in the present disclosure is performed by a master device.

More specifically, the master device may transmit, to a slave device, a read request message requesting a reading of at least one data transmission period supported by the slave device, in S2610.

Next, the master device may receive, from the slave device, a read response message including information on the at least one data transmission period supported by the slave device, S2620.

Subsequently, the master device may receive, from the slave device, a message indicating a selection of a specific content among at least one content related to a service provided by the master device, in S2630.

Subsequently, the master device may transmit, to the slave device, a message for configuring a specific data transmission period among the at least one data transmission period supported by the slave device to the slave device based on (i) a type of the selected specific content and (ii) the information on the at least one data transmission period supported by the slave device, in S2640.

Subsequently, the master device may receive, from the slave device, the data based on the configured specific data transmission period, in S2650.

Next, when the type of the selected specific content is changed, the master device may transmit, to the slave device, a message for reconfiguring the data transmission period of the slave device based on the changed type of the content, in S2660.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure. Further, the present disclosure describes both the product invention and the method invention, and the description of both inventions can be supplementarily applied as needed.

INDUSTRIAL APPLICABILITY

The preferred embodiments of the present disclosure described above are disclosed for an exemplary purpose, and modifications, changes, substitutions, or additions of various other embodiments can be made by those skilled in the art within the technical spirit and the technical scope of the present disclosure described in the appended claims below.

The invention claimed is:

1. A method of receiving, by a master device, data in a short-range wireless communication system, the method comprising:
transmitting, to a slave device, a read request message requesting a reading of at least one data transmission period supported by the slave device;
receiving, from the slave device, a read response message including information on the at least one data transmission period supported by the slave device;
receiving, from the slave device, a message indicating a selection of a specific content among at least one content related to a service provided by the master device;
transmitting, to the slave device, a message for configuring a specific data transmission period among the at least one data transmission period supported by the slave device to the slave device based on (i) a type of the selected specific content and (ii) the information on the at least one data transmission period supported by the slave device; and
receiving, from the slave device, the data based on the configured specific data transmission period,
wherein the method comprises, based on the type of the selected specific content being changed, transmitting, to the slave device, a message for reconfiguring the data transmission period of the slave device based on the changed type of the content.

2. The method of claim 1, further comprising:
receiving, from the slave device, the data based on a data transmission period reconfigured based on the message for reconfiguring the data transmission period of the slave device.

3. The method of claim 2, further comprising:
receiving, from the slave device, a message indicating a selection of a different content from the specific content among the at least one content related to the service provided by the master device,
wherein the content provided by the master device is changed based on the message indicating the selection of the different content from the specific content.

4. The method of claim 2, wherein data transmission period mapping information for a recommendation data transmission period for each of the at least one content related to the service provided by the master device is pre-configured to the master device.

5. The method of claim 4, wherein a data transmission period configuration for the slave device related to one content is performed based on (i) the data transmission period mapping information and (ii) the information on the data transmission period supported by the slave device.

6. The method of claim 5, wherein the data transmission period configuration for the slave device related to the one content is performed based on a value closest to a recommendation data transmission period value for the one content represented by the data transmission period mapping information among at least one common value commonly included in (i) a data transmission period supported by the master device and (ii) the at least one data transmission period supported by the slave device.

7. The method of claim 6, wherein the data transmission period mapping information further includes mode based recommendation data transmission period information for each of different operation modes provided by the one content.

8. The method of claim 7, further comprising:
receiving, from the slave device, a message indicating an operation mode change in the selected specific content; and
transmitting, to the slave device, a message for configuring the data transmission period of the slave device based on (i) the changed operation mode, (ii) the information on the at least one data transmission period supported by the slave device, and (iii) the mode based recommendation data transmission period information.

9. The method of claim 7, wherein the data transmission period mapping information is a mapping relationship between a title of the content and a specific recommendation data transmission period value.

10. The method of claim 9, further comprising:
based on the type of the selected specific content being a type that is not included in the data transmission period mapping information, transmitting, to a server providing the service to the master device, a message requesting recommendation data transmission period information for the selected specific content.

11. The method of claim 1, wherein the data is generated based on a user input for the slave device.

12. The method of claim 11, wherein receiving the data comprises:

transmitting, to the slave device, a poll message requesting a transmission of the data; and receiving the data in response to the poll message, wherein the poll message is transmitted in the same period as the configured data transmission period of the slave device, and wherein the data is transmitted based on a data transmission period of the slave device configured based on the user input being present.

13. The method of claim 12, wherein a channel on which the data is transmitted is an asynchronous channel.

14. The method of claim 11, wherein receiving the data is performed based on a data transmission period of the slave device configured without a poll message, wherein the data is transmitted based on the user input being present, and wherein a channel on which the data is transmitted is an isochronous channel.

15. A master device receiving data in a short-range wireless communication system, the master device comprising:

a transmitter configured to transmit a radio signal;

a receiver configured to receive the radio signal;

at least one processor; and at least one computer memory operably connectable to the at least one processor, wherein the at least one computer memory is configured to store instructions that allow the at least one processor to perform operations based on being executed by the at least one processor, wherein the operations comprise:

transmitting, to a slave device, a read request message requesting a reading of at least one data transmission period supported by the slave device;

receiving, from the slave device, a read response message including information on the at least one data transmission period supported by the slave device;

receiving, from the slave device, a message indicating a selection of a specific content among at least one content related to a service provided by the master device;

transmitting, to the slave device, a message for configuring a specific data transmission period among the at least one data transmission period supported by the slave device to the slave device based on (i) a type of the selected specific content and (ii) the information on the at least one data transmission period supported by the slave device; and receiving, from the slave device, the data based on the configured specific data transmission period, wherein the operations comprise, based on the type of the selected specific content being changed, transmitting, to the slave device, a message for reconfiguring the data transmission period of the slave device based on the changed type of the content.

* * * * *